United States Patent
Kang

(10) Patent No.: US 11,567,860 B2
(45) Date of Patent: Jan. 31, 2023

(54) MEMORY SYSTEM FOR UPDATING MAPPING INFORMATION

(71) Applicant: SK hynix Inc., Gyeonggi-do (KR)

(72) Inventor: Hye Mi Kang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/217,242

(22) Filed: Mar. 30, 2021

(65) Prior Publication Data

US 2022/0138096 A1 May 5, 2022

(30) Foreign Application Priority Data

Nov. 5, 2020 (KR) .......................... 10-2020-0146783

(51) Int. Cl.
*G06F 12/02* (2006.01)
*G06F 12/0831* (2016.01)
*G06F 12/0884* (2016.01)
*G06F 12/123* (2016.01)

(52) U.S. Cl.
CPC ...... *G06F 12/0238* (2013.01); *G06F 12/0292* (2013.01); *G06F 12/0833* (2013.01); *G06F 12/0884* (2013.01); *G06F 12/123* (2013.01); *G06F 2212/7201* (2013.01)

(58) Field of Classification Search
CPC ............. G06F 12/0238; G06F 12/0292; G06F 12/0833; G06F 12/0884; G06F 12/123; G06F 2212/7201
See application file for complete search history.

(56) References Cited

U.S. PATENT DOCUMENTS

| | | | |
|---|---|---|---|
| 2011/0099323 A1* | 4/2011 | Syu | G06F 12/0246 711/E12.001 |
| 2014/0006744 A1* | 1/2014 | Konta | G06F 13/1689 711/169 |
| 2017/0083438 A1* | 3/2017 | Han | G06F 3/0676 |
| 2018/0293174 A1* | 10/2018 | Song | G06F 12/1009 |
| 2020/0218470 A1* | 7/2020 | Cho | G06F 3/0659 |
| 2021/0334215 A1* | 10/2021 | Gole | G06F 3/0644 |

FOREIGN PATENT DOCUMENTS

| | | |
|---|---|---|
| KR | 10-2016-0104387 | 9/2016 |
| KR | 10-2019-0005670 | 1/2019 |

\* cited by examiner

*Primary Examiner* — Aracelis Ruiz
(74) *Attorney, Agent, or Firm* — IP & T Group LLP

(57) ABSTRACT

A memory system includes a storage medium and a controller. The storage medium includes a plurality of memory regions. The controller stores data corresponding to a write request into a memory region of a random attribute or a memory region of a sequential attribute among the memory regions and to update logical-to-physical (L2P) information corresponding to the stored data, and updates, when storing the data into the memory region of the random attribute, physical-to-logical (P2L) information corresponding to the stored data within a P2L table of the memory region of the random attribute.

20 Claims, 28 Drawing Sheets

MEMORY SYSTEM FOR UPDATING MAPPING INFORMATION

CROSS-REFERENCES TO RELATED APPLICATION

The present application claims priority under 35 U.S.C. § 119(a) to Korean application number 10-2020-0146783, filed on Nov. 5, 2020, which is incorporated herein by reference in its entirety as set forth in full.

BACKGROUND

1. Technical Field

Various embodiments are related to a memory system, and more particularly, to a memory system including a nonvolatile memory device.

2. Related Art

A memory system may be configured to store data provided by a host device in response to a write request from the host device. Furthermore, the memory system may be configured to provide stored data to the host device in response to a read request from the host device. The host device is an electronic device capable of processing data and may include a computer, a digital camera or a mobile phone. The memory system to operate may be mounted in the host device or may be fabricated to be capable of being connected to and detached from the host device.

SUMMARY

Embodiments of the present disclosure provide a memory system having improved read performance.

In an embodiment, a memory system may include a storage medium and a controller. The storage medium may include a plurality of memory regions. The controller may be configured to: store data corresponding to a write request into a memory region of a random attribute or a memory region of a sequential attribute among the memory regions and to update logical-to-physical (L2P) information corresponding to the stored data, and update, when storing the data into the memory region of the random attribute, physical-to-logical (P2L) information corresponding to the stored data within a P2L table of the memory region of the random attribute.

In an embodiment, a memory system may include a storage medium and a controller. The storage medium may include a plurality of memory regions. The controller may be configured to refer to a physical-to-logical (P2L) table of a target memory region of a random attribute to determine whether a target read request and one or more other random read requests correspond to sequential physical addresses of the target memory region and configured to control, according to a result of the determination, the storage medium to perform, in parallel, read operations on the target memory region in response to the target read request and the one or more other random read requests.

In an embodiment, a memory system may include a storage medium and a controller. The storage medium may include a plurality of memory regions. The controller may be configured to control, when a target memory region of a target random read request is determined to have a random attribute, the storage medium to perform, in parallel, a read operation for a target physical address corresponding to the target random read request and cache read operations for one or more physical addresses, which are sequential together with the target physical address within the target memory region.

In an embodiment, an operating method of a controller may include: determining sequential physical addresses corresponding to data pieces stored in a superblock as respectively mapped to logical addresses corresponding to queued random read requests for the data pieces by referring to physical-to-logical (P2L) information of the superblock; and controlling, in response to the random read requests, a memory device to perform an operation of reading each of the data pieces in a parallel manner.

In an embodiment, an operating method of a controller may include: controlling, in response to a target random read request, a memory device to perform an operation of outputting a target data piece from a superblock while buffering, from the superblock, each of one or more remaining data pieces other than the target data piece in a parallel manner; determining sequential physical addresses corresponding to the data pieces as respectively mapped to logical addresses corresponding to random read requests for the data pieces by referring to physical-to-logical (P2L) information of the superblock; and controlling, in response to remaining random read requests, the memory device to perform an operation of outputting each of the buffered data pieces in a parallel manner, wherein the random read requests for the data pieces include the target random read request for the target data pieces and the remaining random read requests for the buffered data pieces.

In an embodiment, an operating method of a controller may include: determining sequential physical addresses corresponding to data pieces stored in a superblock as respectively mapped to logical addresses corresponding to queued random unmap requests for the data pieces by referring to physical-to-logical (P2L) information of the superblock; and invalidating the P2L information in response to the random unmap requests.

In an embodiment, an operating method of a controller may include: determining sequential physical addresses corresponding to data pieces stored in a superblock as respectively mapped to logical addresses corresponding to queued random requests for the data pieces by referring to physical-to-logical (P2L) information of the superblock; and performing operations in a parallel manner in response to the queued random requests.

According to an embodiment, provided may be a memory system having improved read performance.

DETAILED DESCRIPTION

Various embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

The drawings are not necessarily to scale and, in some instances, proportions may have been exaggerated in order to clearly illustrate features of the embodiments. The terminology used herein is for the purpose of describing particular embodiments only and is not intended to be limiting of the invention.

As used herein, the term "and/or" includes at least one of the associated listed items. It will be understood that when an element is referred to as being "connected to", or "coupled to" another element, it may be directly on, connected to, or coupled to the other element, or one or more intervening elements may be present. As used herein, singular forms are intended to include the plural forms and vice versa, unless the context clearly indicates otherwise. It will be further understood that the terms "comprises," "comprising," "includes," and "including" when used in this specification, specify the presence of the stated elements and do not preclude the presence or addition of one or more other elements.

Hereinafter, various embodiments of the present disclosure will be described below with reference to the accompanying drawings.

Figure 1:
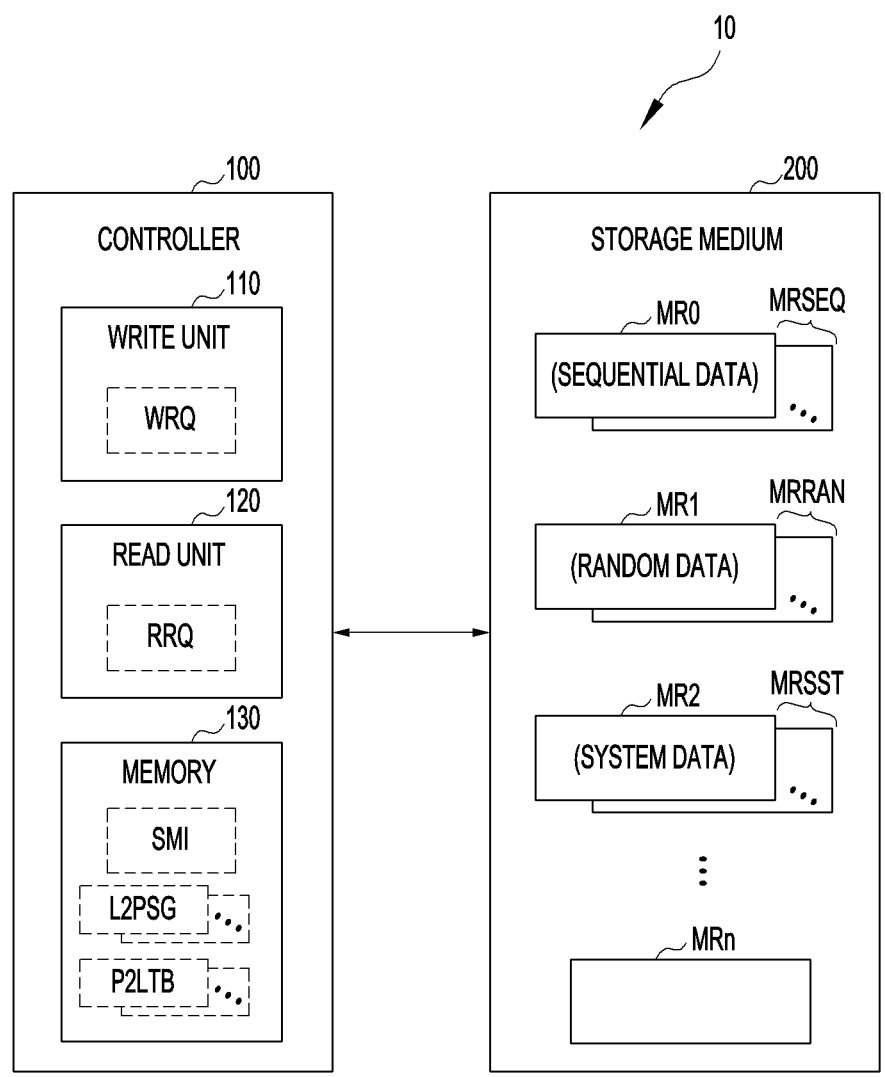
FIG. 1 is a block diagram illustrating a memory system according to an embodiment of the present disclosure.

FIG. 1 is a block diagram illustrating a memory system 10 according to an embodiment of the present disclosure.

The memory system 10 may be configured to store data, which is provided from an external host device, in response to a write request from the host device. The memory system 10 may be configured to provide a host device with data, which is stored therein, in response to a read request from the host device.

A host device may access the memory system 10 through a logical address. For example, a host device may write data into the memory system 10 by assigning a logical address to the data and by providing the memory system 10 with a write request including the data and the logical address.

A file system of a host device such as the extended file system 4 (EXT4) may re-use the same logical address when updating data stored in the memory system 10. For example, when updating data to which a logical address "0" is assigned, the EXT4 may assign again the logical address "0" to the updated data.

On the other hand, a file system of a host device such as the Flash-Friendly File System (F2FS) may assign, when updating data stored in the memory system 10, a new logical address to the updated data. For example, when updating data to which a logical address "0" is assigned, the F2FS may assign a logical address "10" to the updated data.

In general, data in units of files may correspond to sequential logical addresses. However, according to the F2FS, the data in units of files that corresponded to sequential logical addresses may correspond, after update thereof, to fragmented logical addresses (i.e., non-sequential logical addresses) due to the above-described characteristics. Therefore, the updated data in units of files may be stored into the memory system 10 through random write requests for non-sequential logical addresses and may be read from the memory system 10 through random read requests for non-sequential logical addresses.

Moreover, a host device may store, at a time, data in units of files into the memory system 10. Therefore, updated data in units of files will be sequentially stored although the updated data in units of files are to be provided to the memory system 10 through random write requests for non-sequential logical addresses. Accordingly, a controller 100 may store the updated data in units of files into memory units of sequential physical addresses. In a similar manner, a host device may read, at a time, data in units of files from the memory system 10. Therefore, the data in units of files may be sequentially read from the memory system 10 in the order that the data in units of files are stored in the memory system 10.

In the disclosure, pseudo-random data may be referred to as data that are read, when they are to be read in response to random read requests, from memory units of sequential physical addresses in the order that the data are stored in the memory units. For example, pseudo-random data may include data in units of files but fragmented by the F2FS as described above. Pseudo-random data may correspond to random logical addresses while corresponding to sequential physical addresses of a target memory region corresponding to a random read request. As will be described below, the memory system 10 according to an embodiment may have improved read performance for pseudo-random data.

The memory system 10 may be configured as a personal computer memory card international association (PCMCIA) card, a compact flash (CF) card, a smart media card, a memory stick, various multimedia cards (e.g., MMC, eMMC, RS-MMC, and MMC-micro), secure digital (SD) cards (e.g., SD, Mini-SD and Micro-SD), a universal flash storage (UFS) or a solid state drive (SSD).

The memory system 10 may include the controller 100 and a storage medium 200.

The controller 100 may control an overall operation of the memory system 10. The controller 100 may control the storage medium 200 in order to perform a foreground operation in response to an instruction from a host device. The foreground operation may include operations of writing data in the storage medium 200 and reading data from the storage medium 200 in response to instructions from a host device, that is, a write request and a read request.

Furthermore, the controller 100 may control the storage medium 200 in order to perform an internally necessary background operation independently of a host device. The background operation may include at least one among a wear-leveling operation, a garbage collection operation, an erase operation, a read reclaim operation, and a refresh operation for the storage medium 200. Like the foreground operation, the background operation may include operations of writing data in the storage medium 200 and reading data from the storage medium 200.

The controller 100 may include a write unit 110, a read unit 120 and a memory 130.

The write unit 110 may manage a write request queue WRQ. The write request queue WRQ may include one or more write requests provided from a host device. The write unit 110 may enqueue, into the write request queue WRQ, a write request which is received from a host device and may dequeue, from the write request queue WRQ, a write request to which a process is completed.

The write unit 110 may determine whether a write request queued in the write request queue WRQ is a sequential write request or a random write request. For example, when a write request corresponds to a plurality of sequential logical addresses, the write unit 110 may determine the write request as a sequential write request. On the other hand, when a write request corresponds to a single logical address or a plurality of non-sequential logical addresses, the write unit 110 may determine the write request as a random write request. However, according to an embodiment, criteria for determining a write request as a sequential write request or a random write request will not be limited to the above description but there may be various criteria.

The write unit 110 may determine to use an empty memory region, within the storage medium 200, as a sequential memory region having a sequential attribute or as a random memory region having a random attribute. That is, in order to store data into separate memory regions according to an attribute of the data, the write unit 110 may assign the sequential attribute or the random attribute to an empty memory region. The write unit 110 may manage, as storage medium management information SMI, attributes of respective memory regions MR0 to MRn. For example, sequential memory regions MRSEQ having sequential attributes may be memory regions in which sequential data corresponding to a sequential write request is stored. Among the sequential memory regions MRSEQ, an open sequential memory region MR0 may be a sequential memory region that is not yet full of sequential data. For example, random memory regions MRRAN having random attributes may be memory regions in which random data corresponding to a random write request is stored. Among the random memory regions MRRAN, an open random memory region MR1 may be a random memory region that is not yet full of random data.

Therefore, the write unit 110 may store sequential data into the open sequential memory region MR0 within the storage medium 200. Also, the write unit 110 may store random data into the open random memory region MR1 within the storage medium 200.

After storing data into a memory unit within the open sequential memory region MR0 or the open random memory region MR1, the write unit 110 may update mapping information (hereinafter, referred to as L2P information) for a logical address of the data in a Logical to Physical (L2P) segment L2PSG that is stored in the memory 130. The L2P information to be updated may include a physical address mapped to the logical address of the data, i.e., a physical address of the memory unit into which the data is stored.

After storing data into a memory unit within the open random memory region MR1, the write unit 110 may update mapping information (hereinafter, referred to as P2L information) for a physical address of the memory unit in a Physical to Logical (P2L) table P2LTB of the open random memory region MR1, the P2L table P2LTB being stored in the memory 130. The P2L information to be updated may include a logical address mapped to the physical address of the memory unit, i.e., a logical address of the data stored in the memory unit of the physical address.

That is, the write unit 110 may update both of the P2L table P2LTB of the open random memory region MR1 and the L2P segment L2PSG when receiving a random write request and may update the L2P segment L2PSG when receiving a sequential write request.

According to an embodiment, the write unit 110 may generate and manage the P2L table P2LTB for each of the random memory regions MRRAN. In an embodiment, the write unit 110 may generate and manage, as occasion demands, the P2L table P2LTB for a memory region other than the random memory regions MRRAN (e.g., the sequential memory regions MRSEQ).

The read unit 120 may manage a read request queue RRQ. The read request queue RRQ may include one or more read requests provided from a host device. The read unit 120 may enqueue, into the read request queue RRQ, a read request which is received from a host device and may dequeue, from the read request queue RRQ, a read request to which a process is completed.

The read unit 120 may process, as a target read request, a read request that is enqueued at a head of the read request queue RRQ among read requests queued in the read request queue RRQ. The read unit 120 may determine a target read request as a random read request or a sequential read request. Criteria for determining a target read request as a random read request or a sequential read request may be similar to the criteria for determining a write request as a random write request or a sequential write request.

When a target read request is determined as a random read request, the read unit 120 may determine a target memory region. The target memory region may be a memory region including a memory unit, in which data corresponding to a target logical address corresponding to the target read request is stored. The read unit 120 may determine the target memory region based on a target physical address by referring to L2P information of the target logical address within the L2P segment L2PSG and by identifying the target physical address mapped to the target logical address.

The read unit 120 may determine whether the target memory region is a random memory region having a random attribute by referring to the storage medium management information SMI.

When the target memory region is determined as a random memory region, the read unit 120 may determine whether the target read request and one or more other random read requests queued in the read request queue RRQ correspond to sequential physical addresses of the target memory region by referring to the P2L table P2LTB of the target memory region. When the P2L table P2LTB of the target memory region is not currently stored in the memory 130, the read unit 120 loads the P2L table P2LTB of the target memory region from the storage medium 200.

Specifically, the read unit 120 may identify one or more logical addresses mapped to one or more physical addresses, which are sequential together with the target physical address within the P2L table P2LTB of the target memory region. Then, the read unit 120 may determine whether the identified one or more logical addresses are identical to one or more logical addresses corresponding to the one or more other random read requests queued in the read request queue RRQ. The read unit 120 may determine whether the logical addresses corresponding to the one or more other random read requests are respectively mapped to sequential physical addresses of the target memory region, i.e., the one or more physical addresses, which are sequential together with the target physical address within the P2L table P2LTB of the target memory region.

When the target read request and the one or more other random read requests are determined as corresponding to the sequential physical addresses of the target memory region, the read unit 120 may control the storage medium 200 to perform, in parallel, read operations on the target memory region in response to the target read request and the one or more other random read requests. The read unit 120 may control the storage medium 200 to perform, in parallel, read operations for the sequential physical addresses of the target memory region.

The read requests that are processed in parallel according to the above-described operation of the read unit 120 may be read requests for the pseudo-random data. To sum up, the read unit 120 may effectively determine, through the P2L table P2LTB, whether it is possible to process in parallel random read requests for the pseudo-random data and may control the storage medium 200 to perform in parallel read operations for the pseudo-random data corresponding to the random read requests thereby promptly reading the pseudo-random data.

On the other hand, when the target read request and the one or more other random read requests are determined not to correspond to the sequential physical addresses of the target memory region (i.e., the one or more physical addresses, which are sequential together with the target physical address within the P2L table P2LTB of the target memory region), the read unit 120 may control the storage medium 200 to perform a read operation on the target memory region in response to the target read request. That is, the read unit 120 may control the storage medium 200 to perform a read operation for the target physical address of the target memory region.

Further, when the target read request is determined as a random read request but the target memory region is determined as a sequential memory region having a sequential attribute, the read unit 120 may control the storage medium 200 to perform a read operation on the target memory region in response to the target read request.

Still further, when the target read request is determined as a sequential read request, the read unit 120 may control, by referring to the L2P segment L2PSG including the L2P information of the target logical address, the storage medium 200 to perform one or more read operations in response to the target read request.

According to an embodiment, the write request queue WRQ and the read request queue RRQ may be disposed within the memory 130. According to an embodiment, the write request queue WRQ and the read request queue RRQ may be managed not as separate queues but as a single integrated queue.

The memory 130 may store therein the storage medium management information SMI, one or more L2P segments L2PSG and one or more P2L tables P2LTB. Within the memory 130, the storage medium management information SMI, the one or more L2P segments L2PSG and the one or more P2L tables P2LTB may be generated in the course of an operation of the memory system 10. The storage medium management information SMI, the one or more L2P segments L2PSG and the one or more P2L tables P2LTB may be stored in the storage medium 200, which is non-volatile, and may be loaded to the memory 130 from the storage medium 200 in the course of an operation of the memory system 10.

Further, the memory 130 may temporarily store therein data transferred between a host device and the storage medium 200.

The memory 130 may include a volatile memory apparatus and/or a non-volatile memory apparatus. The volatile memory apparatus may include the Dynamic Random Access Memory (DRAM), the Static Random Access Memory (SRAM) and so forth. The non-volatile memory apparatus may include a flash memory device (e.g., the NAND Flash or the NOR Flash), the Ferroelectrics Random Access Memory (FeRAM), the Phase-Change Random Access Memory (PCRAM), the Magnetic Random Access Memory (MRAM), the Resistive Random Access Memory (ReRAM) and so forth.

According to the control of the controller 100, the storage medium 200 may store therein data provided from a host device.

The storage medium 200 may include the plurality of memory regions MR0 to MRn. The memory regions MR0 to MRn may be utilized as the sequential memory regions MRSEQ, the random memory regions MRRAN, system memory regions MRSST and so forth.

The sequential memory regions MRSEQ may be memory regions in which sequential data are stored and may be referred to as having a sequential attribute. The random memory regions MRRAN may be memory regions in which random data are stored and may be referred to as having a random attribute. The system memory regions MRSST may be utilized to store therein the storage medium management information SMI, the L2P segments L2PSG and the P2L tables P2LTB.

The storage medium 200 may include one or more non-volatile memory apparatuses.

Figure 2:
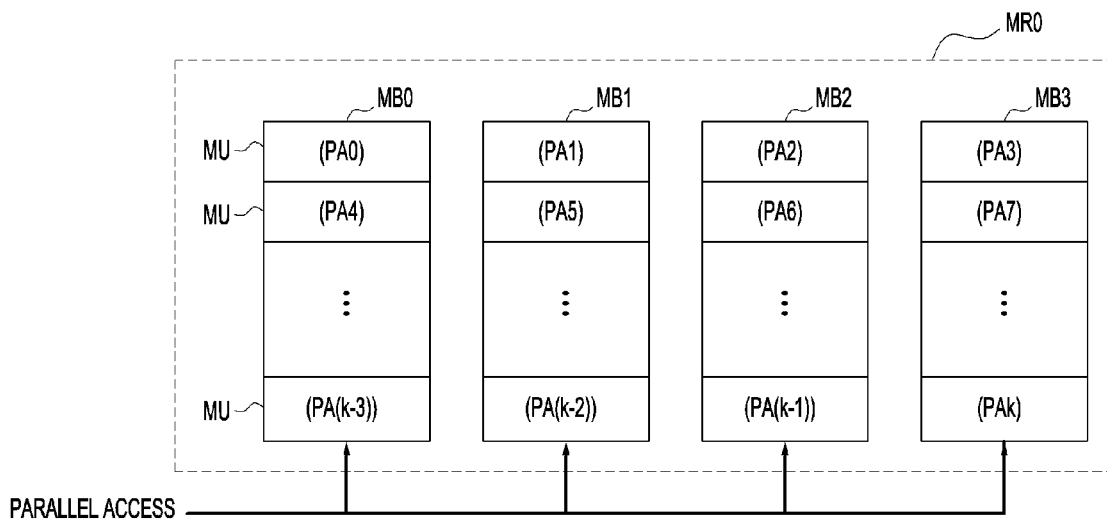
FIG. 2 is a block diagram for describing a structure of a memory region of FIG. 1.

FIG. 2 is a block diagram for describing a structure of the memory region MR0 of FIG. 1. Each of the remaining memory regions MR1 to MRn of FIG. 1 may have a similar structure to the memory region MR0 of FIG. 2.

Referring to FIG. 2, the memory region MR0 may include a plurality of memory blocks. FIG. 2 exemplifies the memory region MR0 including four memory blocks MB0 to MB3. The storage medium 200 may perform an erase operation in units of memory blocks.

Each of the memory blocks MB0 to MB3 may include a plurality of memory units MU. The storage medium 200 may perform a write operation or a read operation in units of memory units MU. A plurality of memory cells coupled to the same word line may correspond to one or more memory units MU. A memory unit MU may be a page.

The controller 100 may control the storage medium 200 to perform write operations in parallel or read operations in parallel on the memory blocks MB0 to MB3. Under the control of the controller 100, the storage medium 200 may access, in parallel, the memory blocks MB0 to MB3. Such a parallel access scheme may increase an amount of data that is written into or read from the storage medium 200 at a time thereby improving the performance of the memory system 10.

To effectively control the parallel access, the memory units MU disposed in parallel within respective memory blocks may be sequentially assigned with sequential physical addresses PA0 to PAk, respectively. Specifically, physical addresses PA0 to PA3 may be sequentially assigned to first memory units MU disposed in parallel within the respective memory blocks MB0 to MB3. Physical addresses PA4 to PA7 may be sequentially assigned to second memory units MU disposed in parallel within the respective memory blocks MB0 to MB3. In such a manner, physical addresses PA(k-3) to PAk may be sequentially assigned to the last memory units MU disposed in parallel within the respective memory blocks MB0 to MB3. Therefore, the controller 100 may control the storage medium 200 to access, in parallel, the memory units MU disposed in parallel and of the four sequential physical addresses within the respective memory blocks MB0 to MB3.

The memory blocks MB0 to MB3 may be disposed within one or more non-volatile memory apparatuses. For example, the memory blocks MB0 to MB3 may be respectively disposed within four different non-volatile memory apparatuses. For example, the memory blocks MB0 and MB1 may be disposed within one non-volatile memory apparatus and the memory blocks MB2 and MB3 may be disposed with another non-volatile memory apparatus. For example, the memory blocks MB0 to MB3 may be disposed within a single non-volatile memory apparatus. Within the memory region MR0, memory blocks disposed within the same non-volatile memory apparatus may be disposed within different planes.

When the memory blocks MB0 to MB3 are disposed within a plurality of non-volatile memory apparatuses, the plurality of non-volatile memory apparatuses may be coupled to the controller 100 through different data lines or through a common data line. Even when the plurality of non-volatile memory apparatuses are coupled to the controller 100 through a common data line, the plurality of non-volatile memory apparatuses may sequentially receive access commands from the controller 100 and may perform, in parallel, access operations that generally require a great amount of time.

The memory region MR0 may be a superblock.

Figure 3:
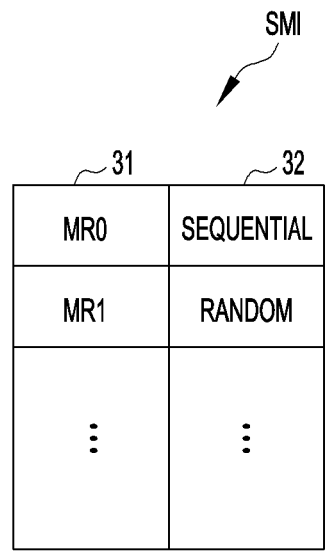
FIG. 3 is a diagram illustrating storage medium management information stored in a memory of FIG. 1 according to an embodiment of the present disclosure.

FIG. 3 is a diagram illustrating the storage medium management information SMI stored in the memory 130 of FIG. 1 according to an embodiment of the present disclosure.

Referring to FIG. 3, the storage medium management information SMI may include information of a memory region address 31 and an attribute 32.

Before starting to utilize an empty memory region, the write unit 110 may update the attribute 32 of the empty memory region into the storage medium management information SMI. That is, the write unit 110 may determine the empty memory region, which is to be utilized, as a sequential memory region having a sequential attribute or as a random memory region having a random attribute and may update the determined attribute into the storage medium management information SMI.

Figure 4A:
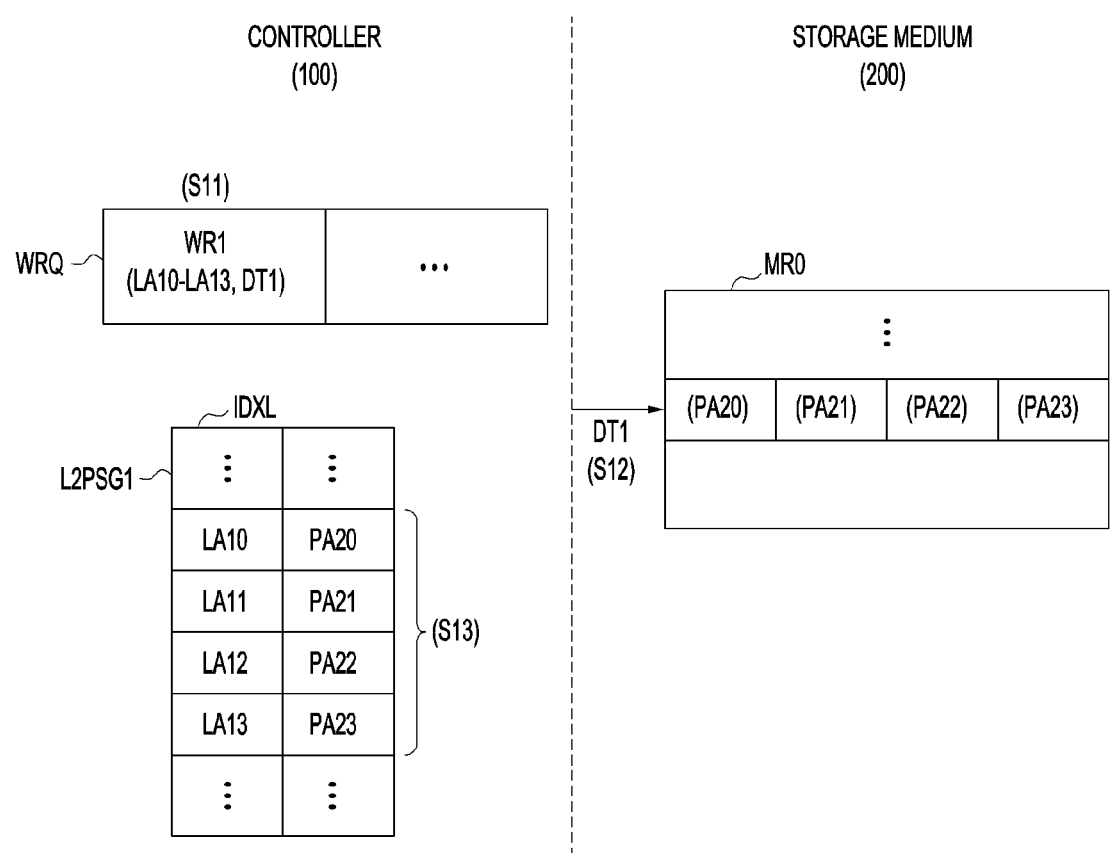
FIGS. 4A and 4B are diagrams illustrating an operation that a write unit of FIG. 1 processes a sequential write request according to an embodiment of the present disclosure.
Figure 4B:
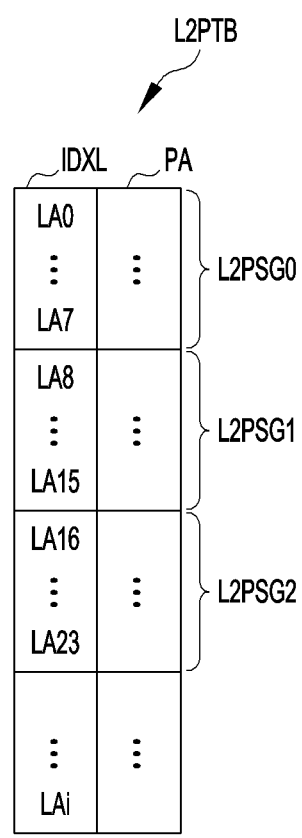

FIGS. 4A and 4B are diagrams illustrating an operation that the write unit 110 of FIG. 1 processes a sequential write request according to an embodiment of the present disclosure.

Referring to FIG. 4A, in operation S11, the write unit 110 may determine a write request WR1 queued in the write request queue WRQ as a sequential write request. For example, the write request WR1 may be for data DT1 corresponding to four logical addresses LA10 to LA13.

In operation S12, the write unit 110 may store the data DT1 into an open sequential memory region MR0 within the storage medium 200. For example, the data DT1 may be stored into memory units corresponding to physical addresses PA20 to PA23 within the open sequential memory region MR0.

In operation S13, the write unit 110 may update the L2P information of the logical addresses LA10 to LA13 into the L2P segment L2PSG1. The updated L2P information may include the physical addresses PA20 to PA23 mapped to the logical addresses LA10 to LA13. The L2P segment L2PSG1 may be a part including the L2P information of the logical addresses LA10 to LA13 within the L2P table L2PTB of FIG. 4B.

Hereinafter, described in more detail with reference to FIG. 4B will be the L2P table L2PTB. The L2P table L2PTB may include mapping information between a logical address of data and a physical address of a memory unit in which the data is stored. For example, the L2P table L2PTB may include, as indexes IDXL, sequential logical addresses LA0 to LAi and may include physical addresses PA mapped to the sequential logical addresses LA0 to LAi.

For effective use of the memory 130, the whole L2P table L2PTB may be stored in the system memory regions MRSST within the storage medium 200 and only a part of the whole L2P table L2PTB may be loaded to the memory 130. The controller 100 may load the L2P table L2PTB in units of predetermined amounts. For example, the predetermined amount may correspond to a size of the L2P segment L2PSG of FIG. 1. For example, the controller 100 may identify the L2P table L2PTB as the L2P segments L2PSG by sequentially dividing the sequential logical addresses LA0 to LAi by 8.

Each L2P segment L2PSG may be referred to through the indexes IDXL or the sequential logical addresses and therefore it is possible to identify a physical address mapped to a particular logical address by referring to the L2P segment L2PSG.

Figure 5:
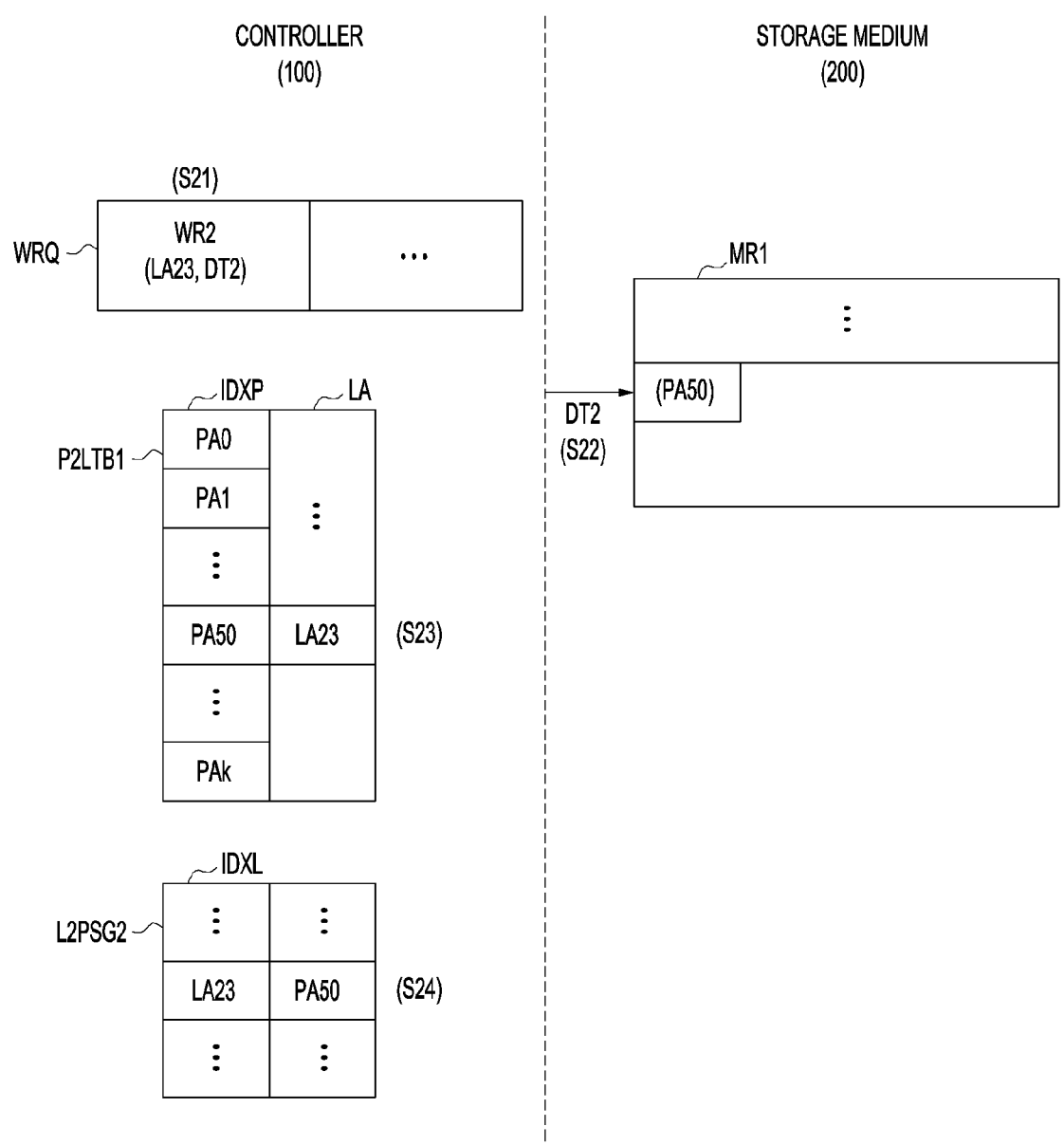
FIG. 5 is a diagram illustrating an operation that a write unit of FIG. 1 processes a random write request according to an embodiment of the present disclosure.

FIG. 5 is a diagram illustrating an operation that the write unit 110 of FIG. 1 processes a random write request according to an embodiment of the present disclosure.

Referring to FIG. 5, in step S21, the write unit 110 may determine a write request WR2 queued in the write request queue WRQ as a random write request. For example, the write request WR2 may be for data DT2 corresponding to a logical address LA23.

In step S22, the write unit 110 may store the data DT2 into an open random memory region MR1 within the storage medium 200. For example, the data DT2 may be stored into a memory unit corresponding to a physical address PA50 within the open random memory region MR1.

In operation S23, the write unit 110 may update the P2L information of the physical address PA50 into the P2L table P2LTB1 of the open random memory region MR1. The updated P2L information may include the logical address LA23 mapped to the physical address PA50.

In operation S24, the write unit 110 may update the L2P information of the logical address LA23 into the L2P segment L2PSG2. The updated L2P information may include the physical address PA50 mapped to the logical address LA23. The L2P segment L2PSG2 may be a L2P segment including the L2P information of the logical address LA23 within the L2P table L2PTB. It is possible to perform any operation first between operations S23 and S24.

Hereinafter, described in more detail will be the P2L table P2LTB1. The P2L table P2LTB1 may include mapping information between a physical address of a memory unit within the open random memory region MR1 and a logical address of data that is stored in the memory unit. For example, the P2L table P2LTB1 may include, as indexes IDXP, sequential physical addresses PA0 to PAk of memory units within the open random memory region MR1 and may include logical addresses LA mapped to the sequential physical addresses PA0 to PAk.

The P2L table P2LTB1 may be referred to through the indexes IDXP or the sequential physical addresses PA0 to PAk and therefore it is possible to identify a logical address mapped to a particular physical address by referring to the P2L table P2LTB1.

Periodically or whenever the open random memory region MR1 becomes full of data, the write unit 110 may store the P2L table P2LTB1 of the open random memory region MR1 into the system memory regions MRSST of the storage medium 200. As occasion demands, the P2L table P2LTB1 may be loaded from the storage medium 200 to the memory 130 to be referred thereto.

According to an embodiment, the write unit 110 may generate the P2L table for the open sequential memory region MR0. According to an embodiment, the write unit 110 may store the P2L table P2LTB1 of the open random memory region MR1 into the storage medium 200 without storing the P2L table of the open sequential memory region MR0 into the storage medium 200.

Each of the random memory regions MRRAN of FIG. 1 may include a corresponding P2L table P2LTB, which has the same structure as the P2L table P2LTB1 of FIG. 5.

Figure 6:
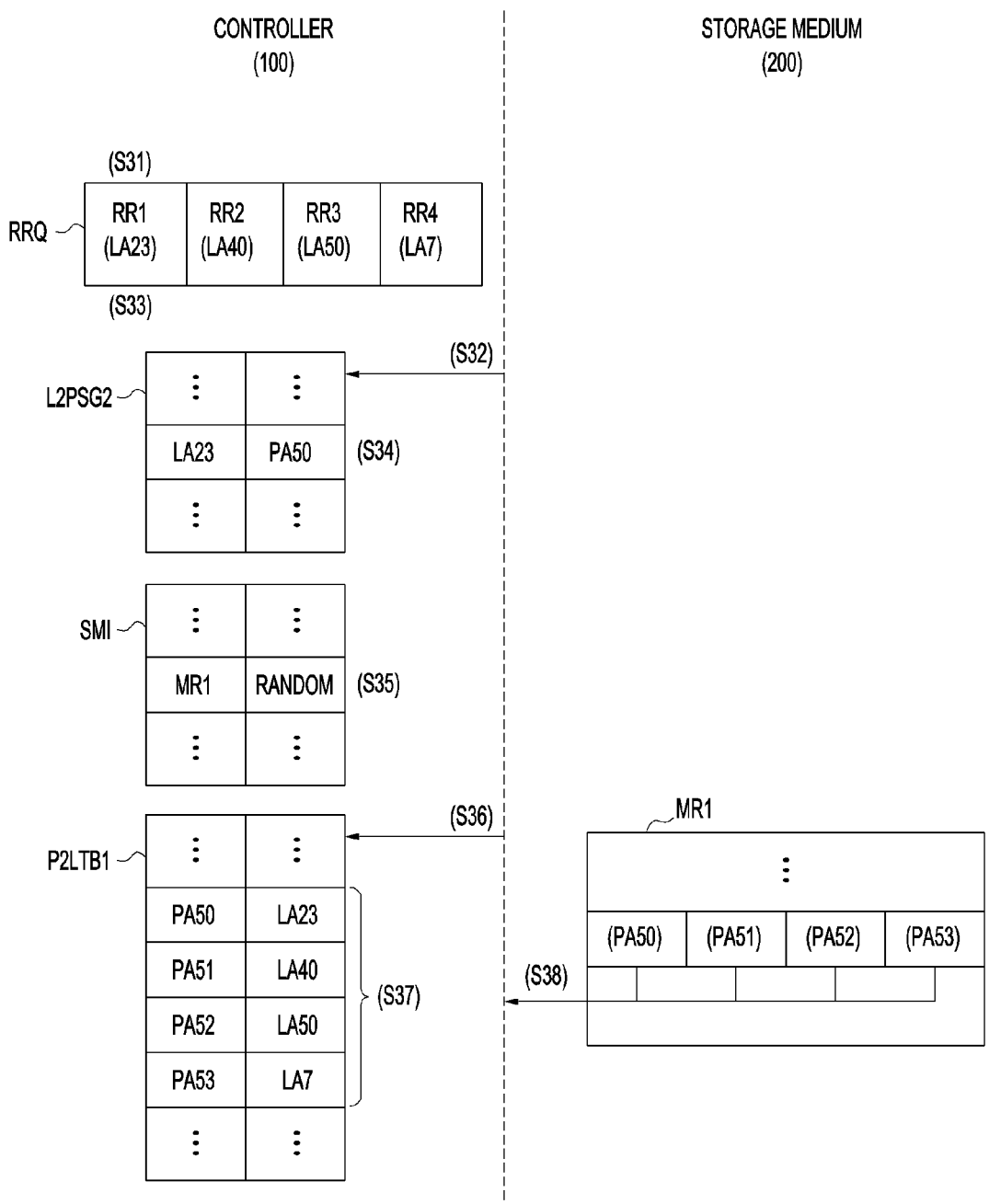
FIG. 6 is a diagram illustrating an operation that a read unit of FIG. 1 processes a random read request according to an embodiment of the present disclosure.

FIG. 6 is a diagram illustrating an operation that the read unit 120 of FIG. 1 processes a random read request according to an embodiment of the present disclosure. FIG. 6 illustrates a case when the controller 100 receives random read requests RR1 to RR4 for pseudo-random data.

Referring to FIG. 6, in operation S31, the read unit 120 may check whether there is a read request in the read request queue RRQ and may identify a target logical address LA23 corresponding to a target read request RR1 that is enqueued at a head of the read request queue RRQ among the random read requests RR1 to RR4.

In operation S32, the read unit 120 may load the L2P segment L2PSG2 from the storage medium 200 to the memory 130 of the controller 100. The L2P segment L2PSG2 may include the L2P information of the target logical address LA23. The L2P information of the target logical address LA23 may include a target physical address PA50 mapped to the target logical address LA23. Operation S32 may be omitted when there is the L2P segment L2PSG2 already in the memory 130.

In operation S33, the read unit 120 may determine the target read request RR1 as a random read request based on the target logical address LA23.

In operation S34, the read unit 120 may determine a target memory region MR1 by referring to the L2P information of the target logical address LA23 within the L2P segment L2PSG2. The target memory region MR1 may be a memory region including a memory unit in which data corresponding to the target logical address LA23 is stored. Specifically, the read unit 120 may identify a target physical address PA50 mapped to the target logical address LA23 by referring to the L2P information of the target logical address LA23 within the L2P segment L2PSG2 and may determine, as the target memory region MR1, a memory region including a memory unit of the target physical address PA50.

In operation S35, the read unit 120 may determine the target memory region MR1 as a random memory region by referring to the storage medium management information SMI. The target memory region MR1 of FIG. 5 may be still an open random memory region, as illustrated in FIG. 1, or may be full of data and thus may not have any empty memory unit.

In operation S36, the read unit 120 may load the P2L table P2LTB1 of the target memory region MR1 from the storage medium 200 to the memory 130. Operation S36 may be omitted when there is the P2L table P2LTB1 already in the memory 130.

In operation S37, the read unit 120 may determine whether the target read request RR1 and one or more other random read requests RR2 to RR4 queued in the read request queue RRQ correspond to sequential physical addresses of the target memory region MR1 by referring to the P2L table P2LTB1 of the target memory region MR1. Specifically, when the random read requests RR2 to RR4 for logical addresses LA40, LA50 and LA7 are further queued in the read request queue RRQ, the read unit 120 may determine the target read request RR1 and the one or more other random read requests RR2 to RR4 as corresponding to sequential physical addresses PA50 to PA53 of the target memory region MR1 because, within the P2L table P2LTB1 of the target memory region MR1, physical addresses PA51 to PA53 that are sequential together with the target physical address PA50 are respectively mapped to the logical addresses LA40, LA50 and LA7 corresponding to the one or more other random read requests RR2 to RR4.

In operation S38, the read unit 120 may control the storage medium 200 to perform, in parallel, read operations on the target memory region MR1 in response to the target read request RR1 and the one or more other random read requests RR2 to RR4. The read unit 120 may control the storage medium 200 to perform, in parallel, read operations for the sequential physical addresses PA50 to PA53 of the target memory region MR1. Then, data corresponding to the read requests RR1 to RR4 may be output from the storage medium 200 and may be provided to a host device.

FIG. 6 illustrates parallel read operations corresponding to all the read requests RR1 to RR4 queued in the read request queue RRQ. On the other hand, depending on how sequential physical addresses are mapped to logical addresses corresponding to random read requests queued in the read request queue RRQ, read operations may be performed in parallel in response to a part of the random read requests queued in the read request queue RRQ. For example, differently from the example of FIG. 6, the read unit 120 may determine a read request right next to the target read request RR1 in the read request queue RRQ as not corresponding to a physical address that is sequential together with the target physical address PA50 and may determine read requests at a distance from the target read request RR1 in the read request queue RRQ as corresponding to physical addresses that are sequential together with the target physical address PA50. In this case, read operations may be performed in parallel in response to the target read request RR1 and the read requests at a distance from the target read request RR1.

Figure 7:
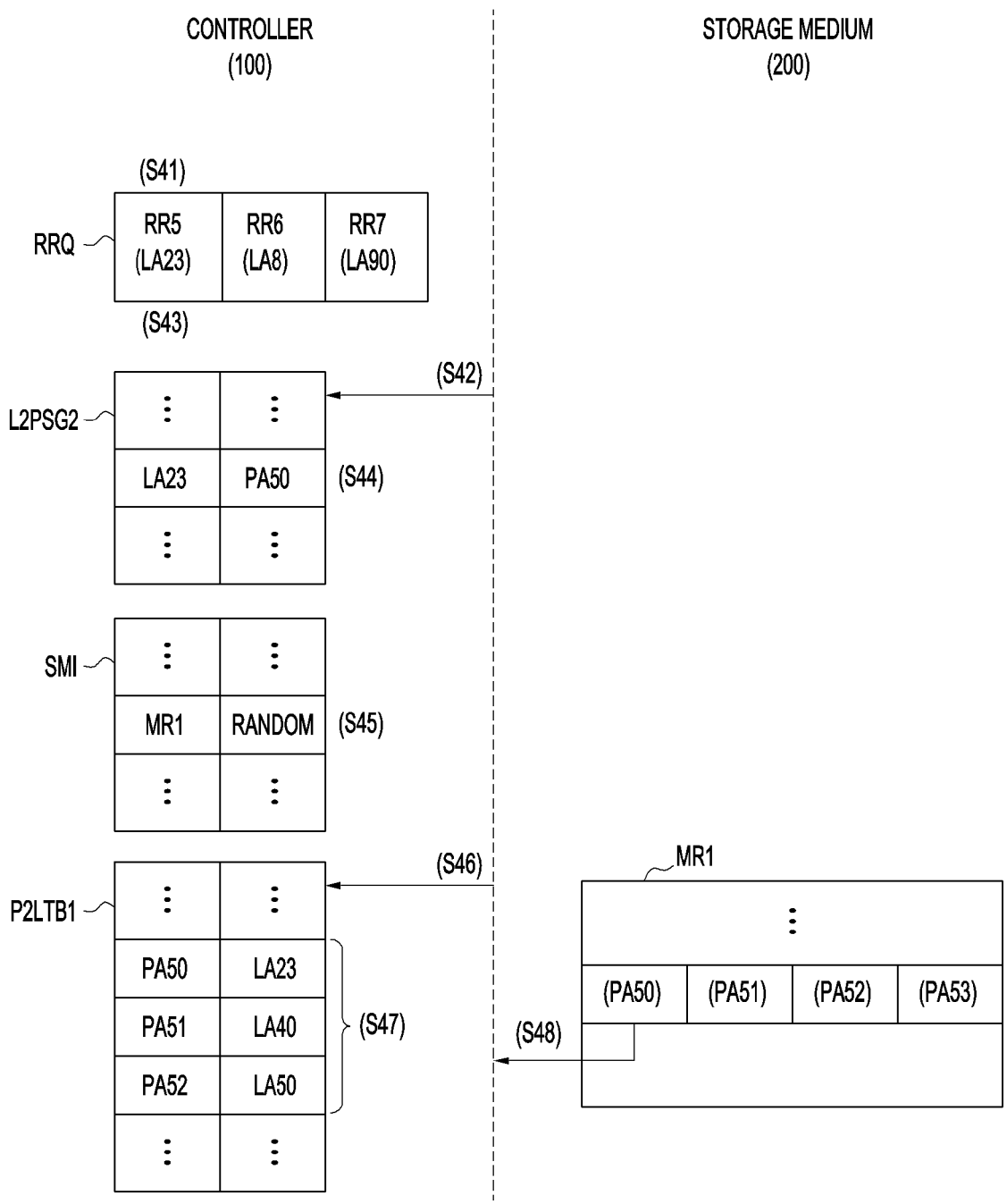
FIG. 7 is a diagram illustrating an operation that a read unit of FIG. 1 processes a random read request according to an embodiment of the present disclosure.

FIG. 7 is a diagram illustrating an operation that the read unit 120 of FIG. 1 processes a random read request according to an embodiment of the present disclosure.

Referring to FIG. 7, operations S41 to S46 may be similar to operations S31 to S36 of FIG. 6. In operation S41, the read unit 120 may check whether there is a read request in the read request queue RRQ and may identify a target logical address LA23 corresponding to a target read request RR5 that is enqueued at a head of the read request queue RRQ among read requests queued in the read request queue RRQ.

In operation S42, the read unit 120 may load, from the storage medium 200 to the memory 130 of the controller 100, the L2P segment L2PSG2 including the L2P information of the target logical address LA23. Operation S42 may be omitted when there is the L2P segment L2PSG2 already in the memory 130.

In operation S43, the read unit 120 may determine the target read request RR5 as a random read request based on the target logical address LA23.

In operation S44, the read unit 120 may determine a target memory region MR1 by referring to the L2P information of the target logical address LA23 within the L2P segment L2PSG2. Specifically, the read unit 120 may identify the target physical address PA50 mapped to the target logical address LA23 by referring to the L2P information of the target logical address LA23 within the L2P segment L2PSG2 and may determine, as the target memory region MR1, a memory region including a memory unit of the target physical address PA50.

In operation S45, the read unit 120 may determine the target memory region MR1 as a random memory region by referring to the storage medium management information SMI.

In operation S46, the read unit 120 may load the P2L table P2LTB1 of the target memory region MR1 from the storage medium 200 to the memory 130. Operation S46 may be omitted when there in the P2L table P2LTB1 already in the memory 130.

In operation S47, the read unit 120 may determine whether the target read request RR5 and one or more other random read requests RR6 and RR7 queued in the read request queue RRQ correspond to sequential physical addresses of the target memory region MR1 by referring to the P2L table P2LTB1 of the target memory region MR1. Specifically, when the random read requests RR6 and RR7 for logical addresses LA8 and LA90 are further queued in the read request queue RRQ, the read unit 120 may determine the target read request RR5 and the one or more other random read requests RR6 and RR7 as not corresponding to sequential physical addresses of the target memory region MR1 because, within the P2L table P2LTB1 of the target memory region MR1, physical addresses PA51 and PA52 that are sequential together with the target physical address PA50 are not mapped to the logical addresses LA8 and LA90 corresponding to the one or more other random read requests RR6 and RR7.

In operation S48, the read unit 120 may control the storage medium 200 to perform a read operation on the target memory region MR1 in response to the target read request RR5. The read unit 120 may control the storage medium 200 to perform a read operation for the target physical address PA50 that is identified when the target memory region MR1 is determined. Then, data corresponding to the target read request RR5 may be output from the storage medium 200 and may be provided to a host device. That is, differently from the example of FIG. 6, the read unit 120 may process the target read request RR5 since the read unit 120 cannot process in parallel the one or more other random read requests RR6 and RR7 together with the target read request RR5.

According to an embodiment, the read unit 120 after operation S47 may stand-by for a predetermined amount of time until a new random read request is received from a host device. When receiving the new random read request within the predetermined amount of time, the read unit 120 may determine whether the target read request RR5 and the new random read request correspond to sequential physical address of the target memory region MR1.

According to an embodiment, differently from the example of FIG. 7, when the read unit 120 in operation S47 determines that there is not any random read request other than the target read request RR5 in the read request queue RRQ, the read unit 120 may stand-by for a predetermined amount of time until another random read request is received from a host device.

Figure 8:
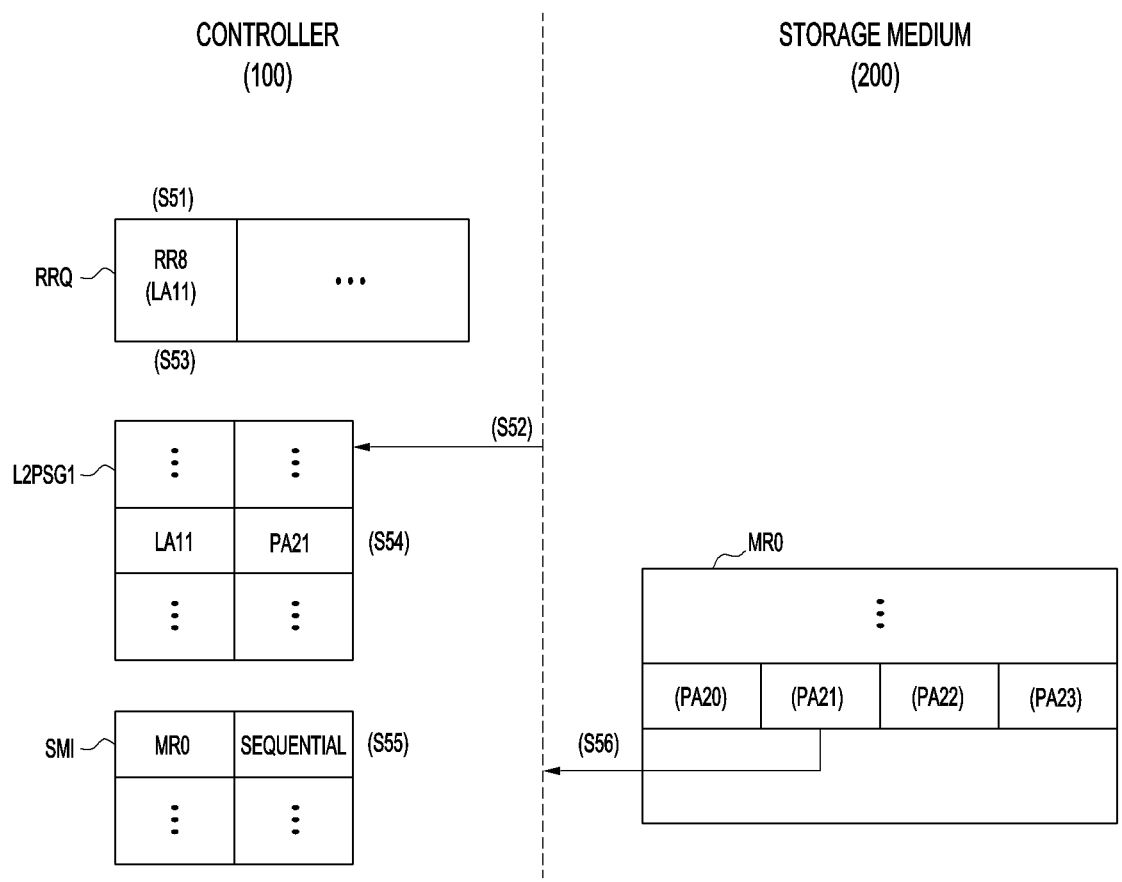
FIG. 8 is a diagram illustrating an operation that a read unit of FIG. 1 processes a random read request according to an embodiment of the present disclosure.

FIG. 8 is a diagram illustrating an operation that the read unit 120 of FIG. 1 processes a random read request according to an embodiment of the present disclosure. FIG. 8 illustrates a case when the controller 100 receives a random read request RR8 for data stored in a sequential memory region MR0.

Referring to FIG. 8, operations S51 to S54 may be similar to steps S31 to S34 of FIG. 6. In operation S51, the read unit 120 may check whether there is a read request in the read request queue RRQ and may identify a target logical address LA11 corresponding to a target read request RR8 that is enqueued at a head of the read request queue RRQ among read requests queued in the read request queue RRQ.

In operation S52, the read unit 120 may load, from the storage medium 200 to the memory 130 of the controller 100, the L2P segment L2PSG1 including the L2P information of the target logical address LA11. Operation S52 may be omitted when there is the L2P segment L2PSG1 already in the memory 130.

In operation S53, the read unit 120 may determine the target read request RR8 as a random read request based on the target logical address LA11.

In operation S54, the read unit 120 may determine the target memory region MR0 by referring to the L2P information of the target logical address LA11 within the L2P segment L2PSG1. Specifically, the read unit 120 may identify the target physical address PA21 mapped to the target logical address LA11 by referring to the L2P information of the target logical address LA11 within the L2P segment L2PSG1 and may determine, as the target memory region MR0, the memory region including a memory unit of the target physical address PA21.

In operation S55, the read unit 120 may determine the target memory region MR0 as a sequential memory region by referring to the storage medium management information SMI. The target memory region MR0 of FIG. 8 may be still an open sequential memory region, as illustrated in FIG. 1, or may be full of data and thus may not have any empty memory unit.

In operation S56, the read unit 120 may control the storage medium 200 to perform a read operation on the target memory region MR0 in response to the target read request RR8. The read unit 120 may control the storage medium 200 to perform a read operation for the target physical address PA21 that is identified when the target memory region MR0 is determined. According to an embodiment, the parallel read operations with reference to the P2L table P2LTB may be allowed when the target memory region is a random memory region. Then, data corresponding to the target read request RR8 may be output from the storage medium 200 and may be provided to a host device.

Figure 9:
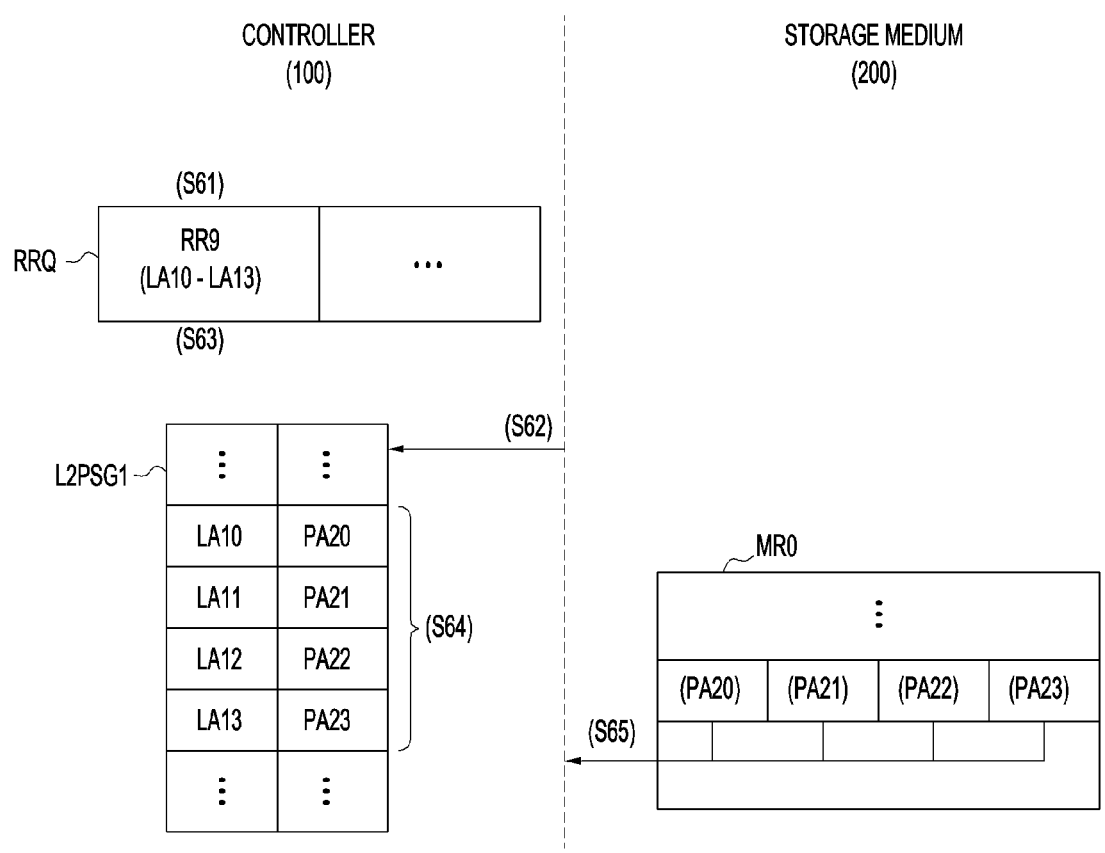
FIG. 9 is a diagram illustrating an operation that a read unit of FIG. 1 processes a sequential read request according to an embodiment of the present disclosure.

FIG. 9 is a diagram illustrating an operation that the read unit 120 of FIG. 1 processes a sequential read request according to an embodiment of the present disclosure.

Referring to FIG. 9, in operation S61, the read unit 120 may check whether there is a read request in the read request queue RRQ and may identify target logical addresses LA10 to LA13 corresponding to a target read request RR9 that is enqueued at a head of the read request queue RRQ among random read requests queued in the read request queue RRQ.

In operation S62, the read unit 120 may load, from the storage medium 200 to the memory 130 of the controller 100, the L2P segment L2PSG1 including the L2P information of the target logical addresses LA10 to LA13. Operation S62 may be omitted when there is the L2P segment L2PSG1 already in the memory 130.

In operation S63, the read unit 120 may determine the target read request RR9 as a sequential read request based on the target logical addresses LA10 to LA13.

In operation S64, the read unit 120 may refer to the L2P information of the target logical addresses LA10 to LA13 within the L2P segment L2PSG1 to control the storage medium 200 to perform read operations in response to the target read request RR9. Specifically, the read unit 120 may identify target physical addresses PA20 to PA23 of a sequential memory region MR0 by referring to the L2P segment L2PSG1, the target physical addresses PA20 to PA23 being mapped to the target logical addresses LA10 to LA13. The read unit 120 may control the storage medium 200 to perform read operations for the target physical addresses PA20 to PA23. Since the target read request RR9 is a sequential read request corresponding to the sequential target physical addresses PA20 to PA23 of the sequential memory region MR0, the read unit 120 may control the storage medium 200 to perform in parallel the read operations for the sequential target physical addresses PA20 to PA23. Then, data corresponding to the target read request RR9 may be output from the storage medium 200 and may be provided to a host device.

Figure 10A:
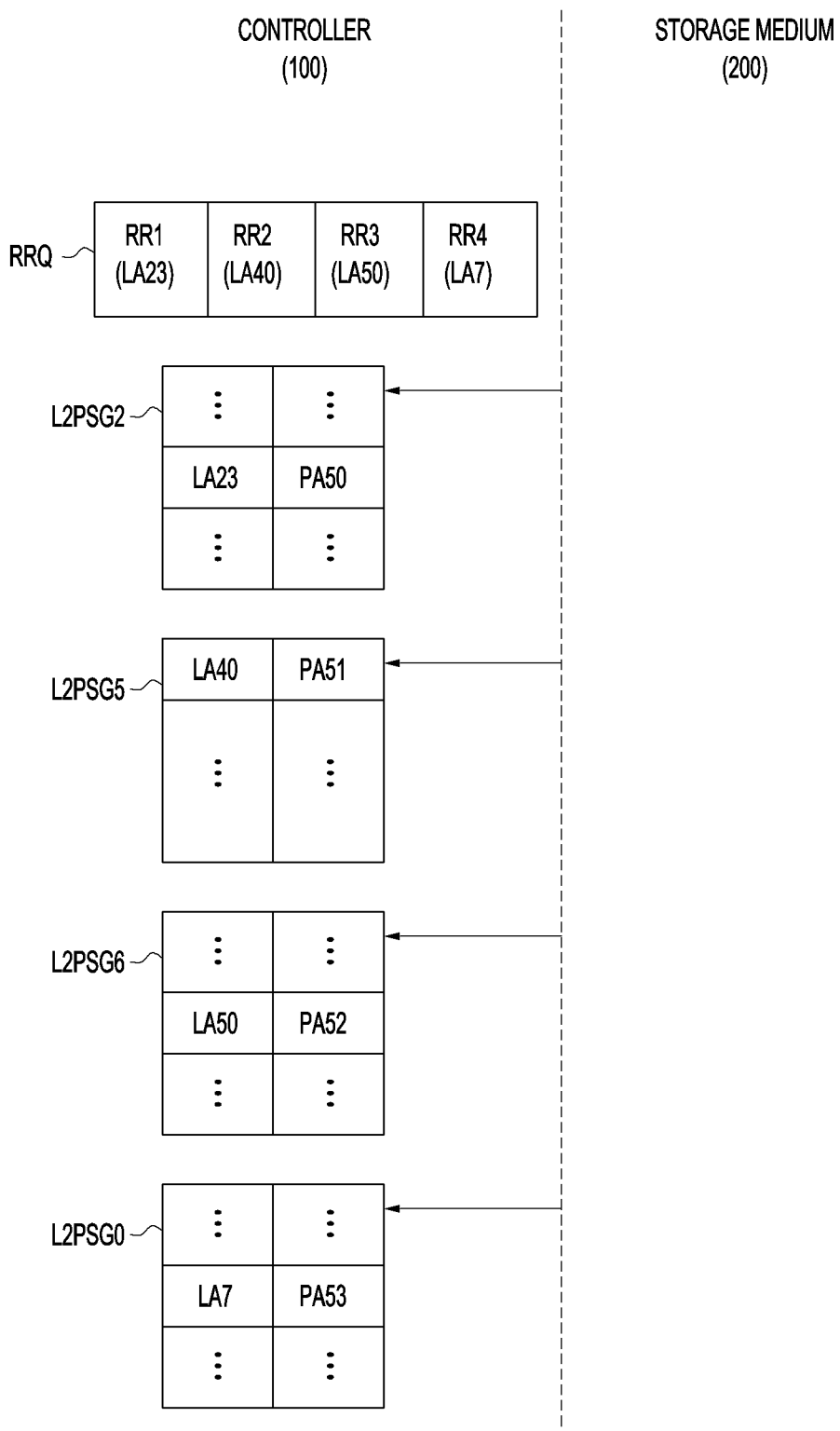
FIGS. 10A to 10C are diagrams for describing an improved effect of read performance for pseudo-random data according to an embodiment of the present disclosure.
Figure 10B:
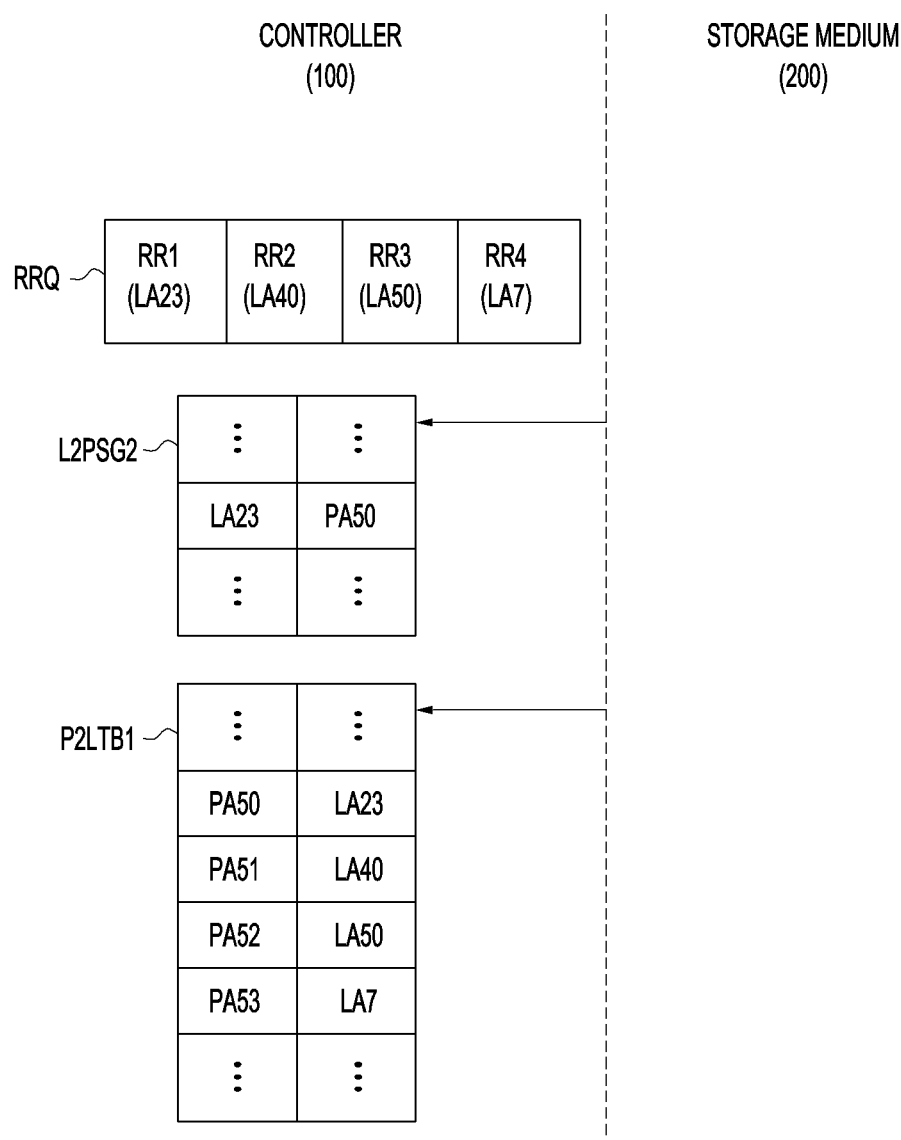
Figure 10C:
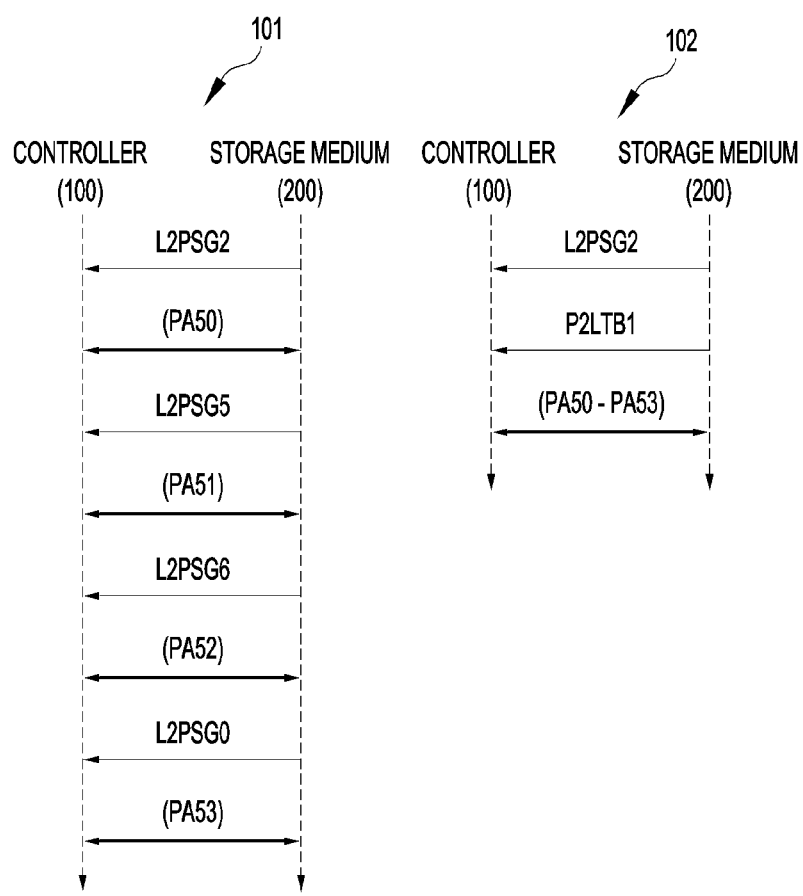

FIGS. 10A to 10C are diagrams for describing an improved effect of read performance for pseudo-random data according to an embodiment of the present disclosure.

Referring to FIG. 10A, the four random read requests RR1 to RR4 corresponding to the logical addresses LA23, LA40, LA50 and LA7 may be enqueued in the read request queue RRQ, as described with reference to FIG. 6. In order to process the random read requests RR1 to RR4, the physical addresses PA50 to PA53 may be identified as mapped to the logical addresses LA23, LA40, LA50 and LA7, as follows.

With reference to L2P segments L2PSG2, L2PSG5, L2PSG6 and L2PSG0 respectively including L2P information of the logical addresses LA23, LA40, LA50 and LA7, the physical addresses PA50 to PA53 may be identified as respectively mapped to the logical addresses LA23, LA40, LA50 and LA7. In FIG. 10A, the L2P information of the logical addresses LA23, LA40, LA50 and LA7 corresponding to the random read requests RR1 to RR4 may be included in different L2P segments L2PSG2, L2PSG5, L2PSG6 and L2PSG0. Therefore, all the L2P segments L2PSG2, L2PSG5, L2PSG6 and L2PSG0 should be loaded from the storage medium 200 to the memory 130 of the controller 100, which may degrade the read performance.

However, referring to FIG. 10B, the read unit 120 according to an embodiment may promptly identify the physical addresses PA51 to PA53 corresponding to the one or more other random read requests RR2 to RR4 by utilizing only the L2P segment L2PSG2 including the L2P information of the target logical address LA23 and the P2L table P2LTB1 including the P2L information of the target physical address PA50, as described with reference to FIG. 6. That is, the pseudo-random data may be stored into the memory units of the sequential physical addresses PA50 to PA53 within the target memory region through the random write requests, which are sequential, and then may be read-requested through the random read requests RR1 to RR4, which are sequential. At this time, the read unit 120 may promptly identify the sequential physical addresses PA50 to PA53 through the L2P segment L2PSG2 and the P2L table P2LTB1 of the target memory region. Therefore, according to an embodiment, a number of times that the mapping information is loaded may decrease, which improves the read performance.

Further, referring to FIG. 10C, case 101 illustrates that, when each of the physical addresses PA50 to PA53 is identified by sequentially loading each of the L2P segments L2PSG2, L2PSG5, L2PSG6 and L2PSG0 from the storage medium 200 to the memory 130 (see thin arrows in case 101 of FIG. 10C), a read operation may be performed for each of the physical addresses PA50 to PA53 (see thick arrows in case 101 of FIG. 10C), as described with reference to FIG. 10A.

Case 102 of FIG. 10C exemplarily illustrates that the sequential physical addresses PA50 to PA53 may be promptly identified by loading the L2P segment L2PSG2 and the P2L table P2LTB1 from the storage medium 200 to the memory 130 (see thin arrows in case 102 of FIG. 10C) and then the parallel read operations may be performed for the sequential physical addresses PA50 to PA53 (see a thick arrow in case 102 of FIG. 10C), as described with reference to FIGS. 6 and 10B. That is, according to an embodiment, the random read requests may be promptly processed, which improves the read performance.

Figure 11:
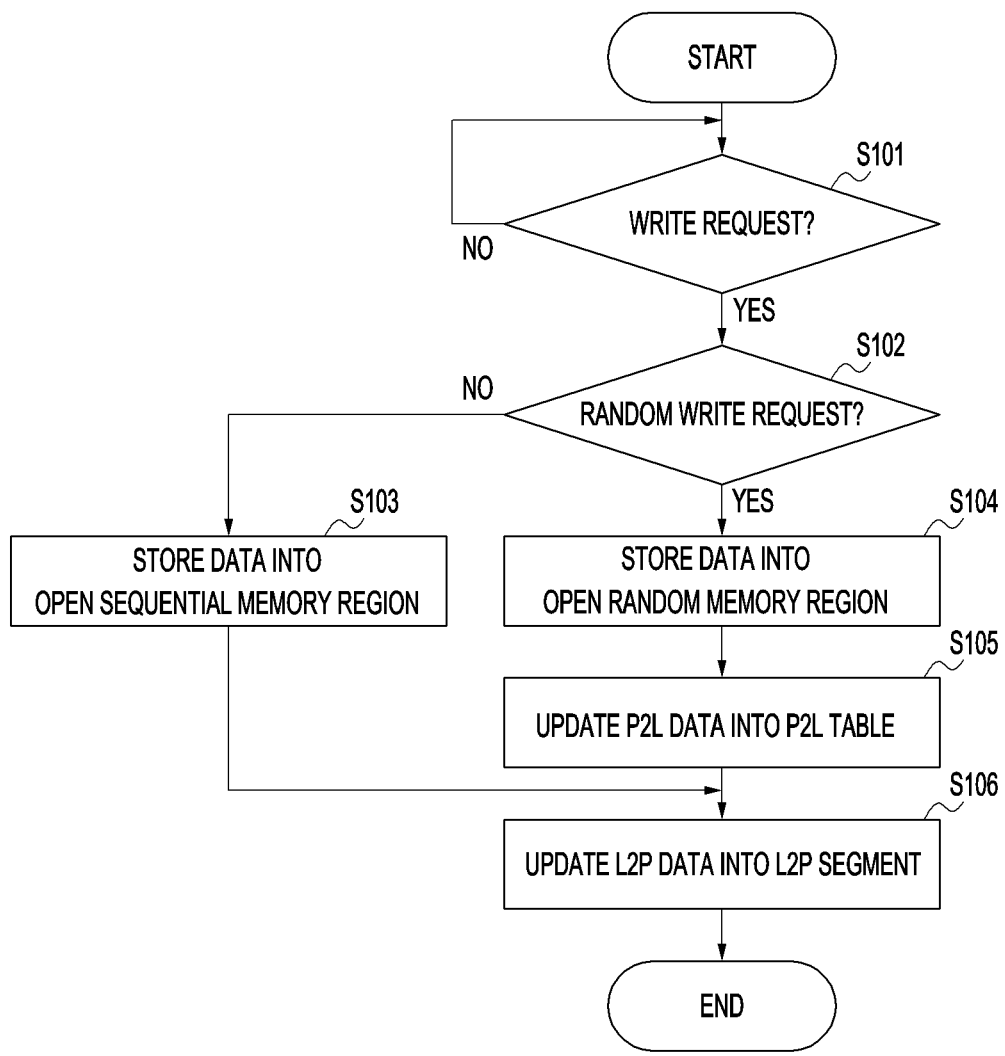
FIG. 11 is a flowchart illustrating an operating method of a write unit of FIG. 1 according to an embodiment of the present disclosure.

FIG. 11 is a flowchart illustrating an operating method of the write unit 110 of FIG. 1 according to an embodiment of the present disclosure.

Referring to FIG. 11, in operation S101, the write unit 110 may check whether there is a write request in the write request queue WRQ. Operation S101 may be repeated when it is checked that there is not a write request in the write request queue WRQ. That is, the write unit 110 may repeat operation S101 until a write request is provided from a host device and enqueued into the write request queue WRQ. The process may proceed to operation S102 when it is checked that there is a write request in the write request queue WRQ.

In operation S102, the write unit 110 may determine whether the write request is a random write request. When the write request is determined as not a random write request, that is, when the write request is determined as a sequential write request, the process may proceed to operation S103. When the write request is determined as a random write request, the process may proceed to operation S104.

In operation S103, the write unit 110 may store data, which corresponds to the write request, into an open sequential memory region MR0. The write unit 110 may control the storage medium 200 to perform a write operation on the open sequential memory region MR0.

In operation S104, the write unit 110 may store the data, which corresponds to the write request, into an open random memory region MR1. The write unit 110 may control the storage medium 200 to perform a write operation on the open random memory region MR1.

In operation S105, the write unit 110 may update the P2L information of the memory unit, in which the data is stored, into the P2L table P2LTB of the open random memory region MR1, the P2L table P2LTB being stored in the memory 130. The updated P2L information may include a logical address mapped to a physical address of the memory unit and the mapped logical address may be a logical address of the data.

In operation S106, the write unit 110 may update the L2P information of the logical address of the data into the L2P segment L2PSG stored in the memory 130. The L2P information may include the physical address mapped to the logical address of the data and the mapped physical address may be a physical address of the memory unit, in which the data is stored. When the write request is the sequential write request, the write unit 110 may update the L2P information of the plurality of sequential logical addresses.

Figure 12:
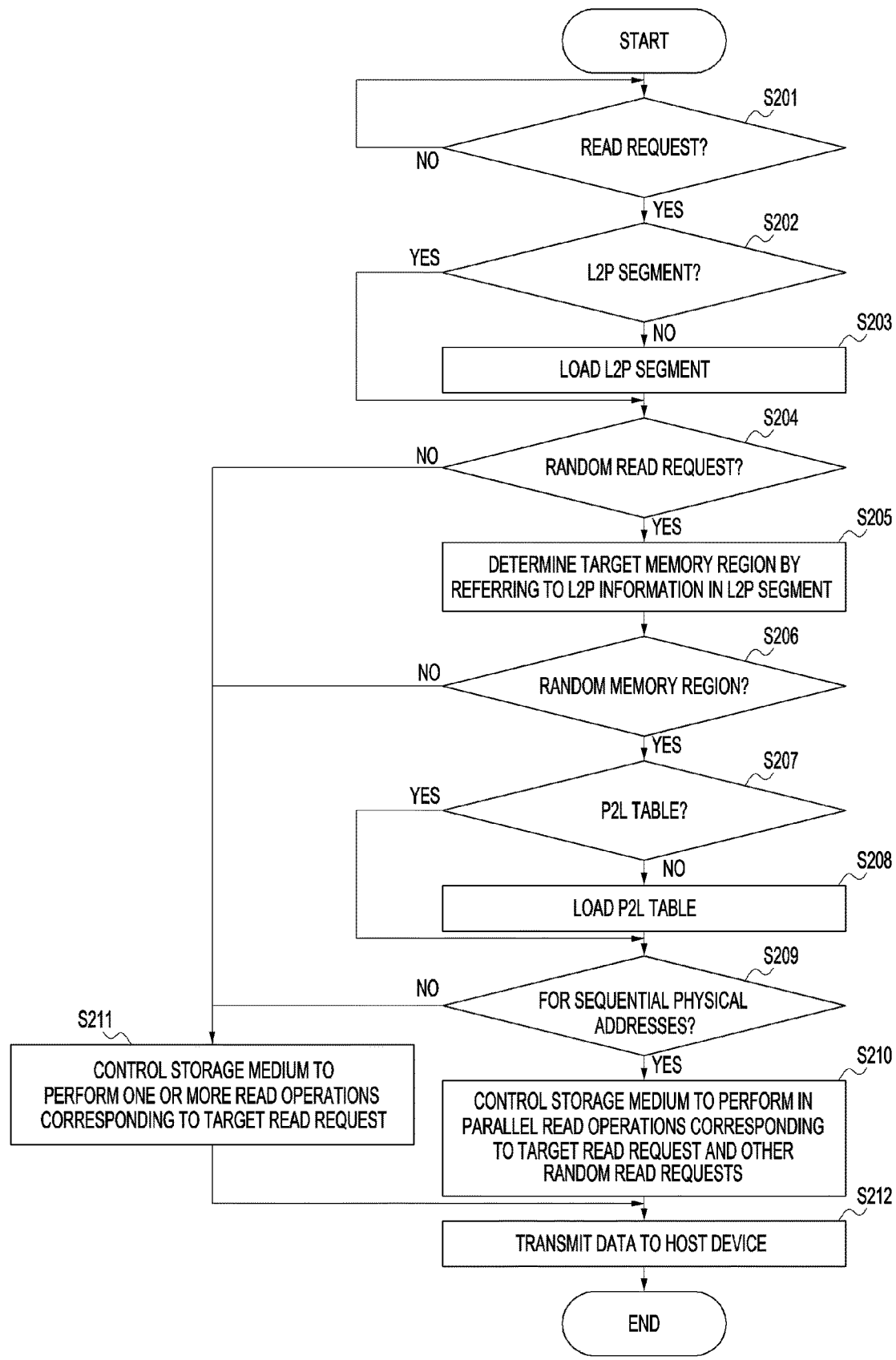
FIG. 12 is a flowchart illustrating an operating method of a read unit of FIG. 1 according to an embodiment of the present disclosure.

FIG. 12 is a flowchart illustrating an operating method of the read unit 120 of FIG. 1 according to an embodiment of the present disclosure.

Referring to FIG. 12, in operation S201, the read unit 120 may check whether there is a read request in the read request queue RRQ. Operation S201 may be repeated when it is checked that there is not a read request in the read request queue RRQ. That is, the read unit 120 may repeat operation S201 until a read request is provided from a host device and enqueued into the read request queue RRQ. The process may proceed to operation S202 when it is checked that there is a read request in the read request queue RRQ. When there are a plurality of read requests in the read request queue RRQ, the target read request may be a read request that is enqueued at a head of the read request queue RRQ among the plurality of read requests in the read request queue RRQ.

In operation S202, the read unit 120 may check whether there is, in the memory 130, the L2P segment L2PSG including the L2P information of the target read address of the target read request. When it is checked that there is the L2P segment L2PSG in the memory 130, the process may proceed to operation S204. When it is checked that there is not the L2P segment L2PSG in the memory 130, the process may proceed to operation S203.

In operation S203, the read unit 120 may load the L2P segment L2PSG from the storage medium 200 to the memory 130. The loaded L2P segment L2PSG may include the L2P information of the target logical address. The L2P information of the target logical address may include a target physical address mapped to the target logical address.

In operation S204, the read unit 120 may determine whether the target read request is a random read request. When the target read request is determined as not a random read request, that is, when the target read request is determined as a sequential read request, the process may proceed to operation S211. When the target read request is determined as a random read request, the process may proceed to operation S205.

In operation S205, the read unit 120 may determine a target memory region by referring to the L2P information of the target logical address within the L2P segment L2PSG stored in the memory 130. The target memory region may be a memory region including a memory unit, in which data corresponding to the target logical address is stored. The read unit 120 may determine, as the target memory region, a memory region including the memory unit of the target physical address by referring to the L2P information of the target logical address within the L2P segment L2PSG and by identifying the target physical address mapped to the target logical address.

In operation S206, the read unit 120 may determine whether the target memory region is a random memory region by referring to the storage medium management information SMI stored in the memory 130. When the target memory region is determined as not a random memory region, that is, when the target memory region is determined as a sequential memory region, then proceed to operation S211. When the target memory region is determined as a random memory region, then proceed to operation S207.

In operation S207, the read unit 120 may check whether there is the P2L table P2LTB of the target memory region in the memory 130. When it is checked that there is the P2L table P2LTB of the target memory region in the memory 130, the process may proceed to operation S209. When it is checked that there is not the P2L table P2LTB of the target memory region in the memory 130, the process may proceed to operation S208.

In operation S208, the read unit 120 may load the P2L table P2LTB of the target memory region from the storage medium 200 to the memory 130.

In operation S209, the read unit 120 may determine whether the target read request and one or more other random read requests queued in the read request queue RRQ correspond to sequential physical addresses of the target memory region by referring to the P2L table P2LTB of the target memory region. Specifically, the read unit 120 may identify one or more logical addresses mapped to one or more physical addresses, which are sequential together with the target physical address within the P2L table P2LTB of the target memory region. Then, the read unit 120 may determine whether the identified one or more logical addresses are identical to one or more logical addresses corresponding to the one or more other random read requests queued in the read request queue RRQ. The read unit 120 may determine whether the logical addresses corresponding to the one or more other random read requests are respectively mapped to the sequential physical addresses of the target memory region, i.e., the one or more physical addresses, which are sequential together with the target physical address within the P2L table P2LTB of the target memory region. When the target read request and the one or more other random read requests are determined as corresponding to sequential physical addresses of the target memory region, the process may proceed to operation S210.

On the other hand, when there is not any random request other than the target read request in the read request queue RRQ or when the target read request and the one or more other random read requests are determined as not corresponding to sequential physical addresses of the target memory region, the process may proceed to operation S211. According to an embodiment, when there is not any random request other than the target read request in the read request queue RRQ or when the target read request and the one or more other random read requests are determined as not corresponding to sequential physical addresses of the target memory region, the read unit 120 may stand-by for a predetermined amount of time until another random read request is received from a host device.

In operation S210, the read unit 120 may control the storage medium 200 to perform, in parallel, read operations on the target memory region in response to the target read request and the one or more other random read requests. The read unit 120 in operation S209 may control the storage medium 200 to perform, in parallel, read operations for the sequential physical addresses of the target memory region, the sequential physical addresses being identified through the P2L table P2LTB of the target memory region.

In operation S211, the read unit 120 may control the storage medium 200 to perform one or more read operations on the target memory region in response to the target read request. Specifically, when the process proceeds from operation S204 to operation S211 (i.e., the case of 'NO' in step S204), the read unit 120 may identify target physical addresses mapped to target logical addresses of the target read request or the sequential read request by referring to the L2P segment L2PSG and may control the storage medium 200 to perform read operations for the target physical addresses. When the process proceeds from operation S206 or operation S209 to operation S211 (i.e., the case of 'NO' in operation S206 or S209), the read unit 120 may control the storage medium 200 to perform a read operation on the target physical address since the target physical address is identified in operation S205 where the target memory region is determined with reference to the L2P segment L2PSG.

In operation S212, the read unit 120 may provide a host device with data that is read from the storage medium 200.

The read requests that are not processed in parallel together with the target read request due to operation S211 and therefore remain in the read request queue RRQ may be processed as another target read requests according to the above described process of FIG. 12.

Figure 13:
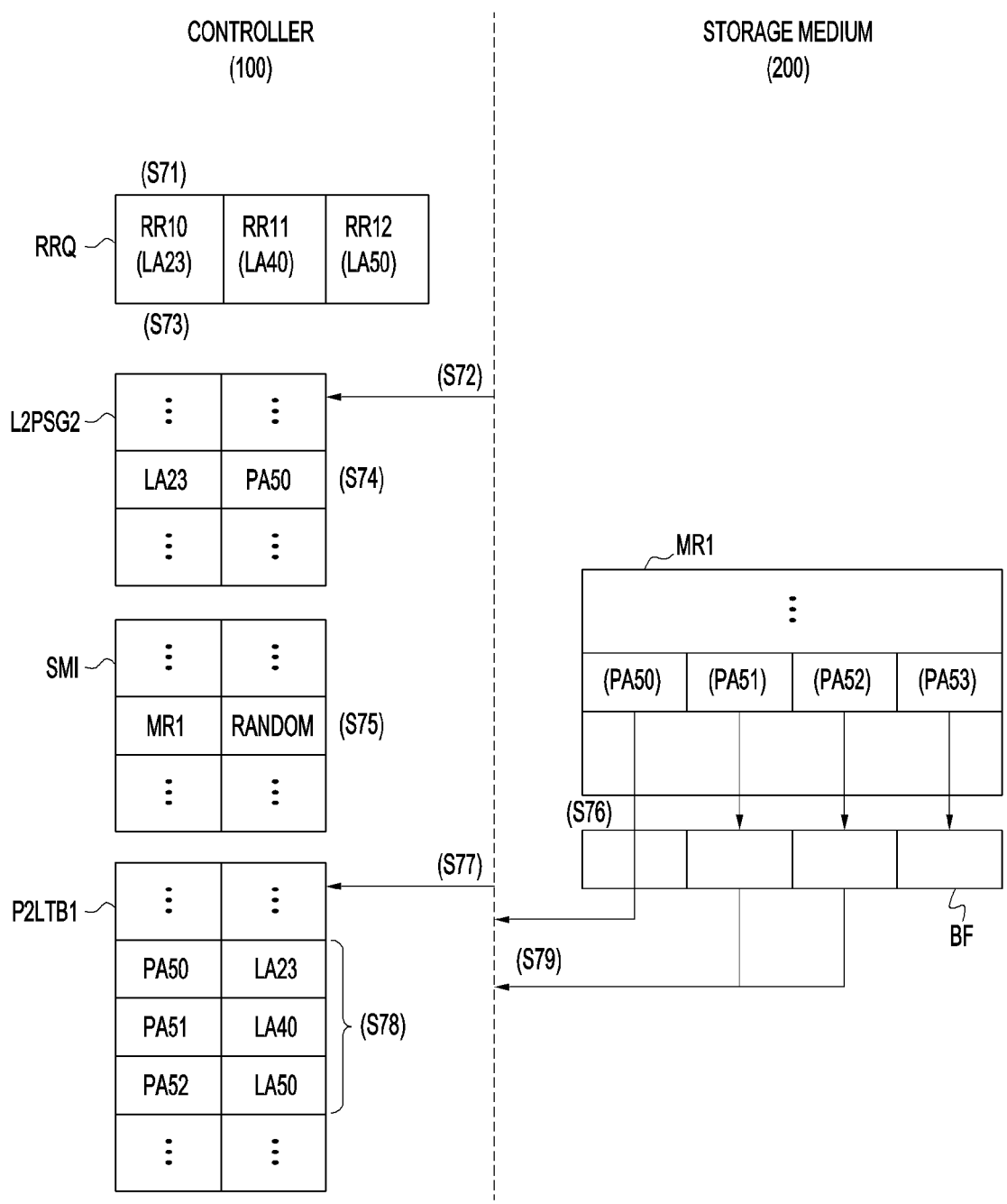
FIG. 13 is a diagram illustrating an operating method of a read unit of FIG. 1 according to an embodiment of the present disclosure.

FIG. 13 is a diagram illustrating an operating method of the read unit 120 of FIG. 1 according to an embodiment of the present disclosure. According to an embodiment of FIG. 13, the read unit 120 may perform a cache read operation thereby improving read performance.

The storage medium 200 may further include a plurality of internal buffers such as internal buffers BF illustrated for example in FIG. 13. Each non-volatile memory apparatus within the storage medium 200 may include one or more internal buffers. Before being provided to the controller 100, data read from a memory unit may be temporarily stored into an internal buffer included in the same non-volatile memory apparatus as the memory unit. The internal buffer may be a page buffer.

The read unit 120 may control the storage medium 200 to perform a cache read operation. The cache read operation may be an operation of keeping (i.e., caching) data, which is read from a memory unit into an internal buffer, in the internal buffer without providing the controller 100 with the read data. Under the control of the controller 100, the storage medium 200 may perform cache read operations in parallel, which is similar to the parallel read operations. For example, the read unit 120 may control the storage medium 200 to perform, in parallel, cache read operations on sequential physical addresses of a single memory region.

The read unit 120 may further control the storage medium 200 to perform a cache output operation. The cache output operation may be an operation of providing the controller 100 with data, which is cached in the internal buffer.

The operation of the read unit 120 illustrated in FIG. 13 may include the cache read operation of operation S76, instead of the read operation in operation S38 of FIG. 6, thereby improving the read performance.

Referring to FIG. 13, in operation S71, the read unit 120 may check whether there is a read request in the read request queue RRQ and may identify a target logical address LA23 of a target read request RR10 that is enqueued at a head of the read request queue RRQ.

In operation S72, the read unit 120 may load, from the storage medium 200 to the memory 130 of the controller 100, the L2P segment L2PSG2 including the L2P information of the target logical address LA23. Operation S72 may be omitted when there is the L2P segment L2PSG2 already in the memory 130.

In operation S73, the read unit 120 may determine the target read request RR10 as a random read request based on the target logical address LA23.

In operation S74, the read unit 120 may determine a target memory region MR1 by referring to the L2P information of the target logical address LA23 within the L2P segment L2PSG2. Specifically, the read unit 120 may identify a target physical address PA50 mapped to the target logical address LA23 by referring to the L2P information of the target logical address LA23 within the L2P segment L2PSG2 and may determine, as the target memory region MR1, a memory region including a memory unit of the target physical address PA50.

In operation S75, the read unit 120 may determine the target memory region MR1 as a random memory region by referring to the storage medium management information SMI.

In operation S76, the read unit 120 may control the storage medium 200 to perform, in parallel, a read operation for the target physical address PA50 and cache read operations for physical addresses PA51 to PA53, which are sequential together with the target physical address PA50. The physical addresses PA51 to PA53 may be physical addresses of a maximum number, for which the cache read operations can be performed in parallel with the read operation for the target physical address PA50 on the target memory region MR1. Data read from the memory unit of the target physical address PA50 may be output from the storage medium 200 and may be provided to a host device. On the other hand, data stored in the memory units of the physical addresses PA51 to PA53 may be cached into the internal buffers BF through the cache read operations.

In operation S77, the read unit 120 may load the P2L table P2LTB1 of the target memory region MR1 from the storage medium 200 to the memory 130. Operation S77 may be omitted when there is the P2L table P2LTB1 already in the memory 130.

In operation S78, the read unit 120 may determine the target read request RR10 and one or more other random read requests RR11 and RR12 queued in the read request queue RRQ as corresponding to sequential physical addresses PA50 to PA52 of the target memory region MR1 (that is, cache hit for the one or more other random read requests RR11 and RR12) by referring to the P2L table P2LTB1 of the target memory region MR1. The process of the determination of the target read request RR10 and the one or more other random read requests RR11 and RR12 queued in the read request queue RRQ as corresponding to sequential physical addresses PA50 to PA52 of the target memory region MR1 may be similar to operation S37 of FIG. 6.

In operation S79, the read unit 120 may control the storage medium 200 to perform cache output operations on data corresponding to the one or more other random read requests RR11 and RR12 among data cached in the internal buffers BF. That is, the read unit 120 may control the storage medium 200 to perform cache output operations on data corresponding to the physical addresses PA51 and PA52 among data cached in the internal buffers BF. The data output from the storage medium 200 may be directly provided to a host device.

According to an embodiment, the read unit 120 after operation S79 may stand-by for a predetermined amount of time until a new random read request is received from a host device. When receiving the new random read request within the predetermined amount of time, the read unit 120 may determine whether the previously processed read requests RR10 to RR12 and the new random read request correspond to sequential physical address of the target memory region MR1.

According to an embodiment, differently from the example of FIG. 13, when the read unit 120 in operation S78 determines that there is not any random read request other than the target read request RR10 in the read request queue RRQ, the read unit 120 may stand-by for a predetermined amount of time until another random read request is received from a host device.

According to an embodiment, differently from the example of FIG. 13, the read unit 120 in operation S76 may control the storage medium 200 to perform, in parallel, cache read operations for the target physical address PA50 and the sequential physical addresses PA51 to PA53. Data stored in the memory units of the sequential physical addresses PA50 to PA53 may be cached into the internal buffers BF through the cache read operation. Then, the read unit 120 may control the storage medium 200 to perform the cache output operation on the data corresponding to the target physical address PA50 among the data cached in the internal buffers BF.

To sum up, when data is read out from a memory unit to the controller 100, time required to read data from the memory unit into the internal buffer BF may be much longer than time required to output data from the internal buffer BF to the controller 100. Therefore, if the cache read operations may be performed in advance for the physical addresses PA51 to PA53, which are sequential together with the target physical address PA50, and there occurs the cache hit for a read request, the read request may be promptly processed. In this case, according to an embodiment, it may be effectively determined whether there occurs the cache hit with reference to the P2L table P2LTB1 of the target memory region MR1. For example, when the P2L table P2LTB1 is not referred to, each of the L2P segments L2PSG5 and L2PSG6 should be checked, as described with reference to FIG. 10A. This approach may delay the determination on whether there occurs the cache hit, which is ineffective. Therefore, the read performance may be much improved according to an embodiment.

Figure 14A:
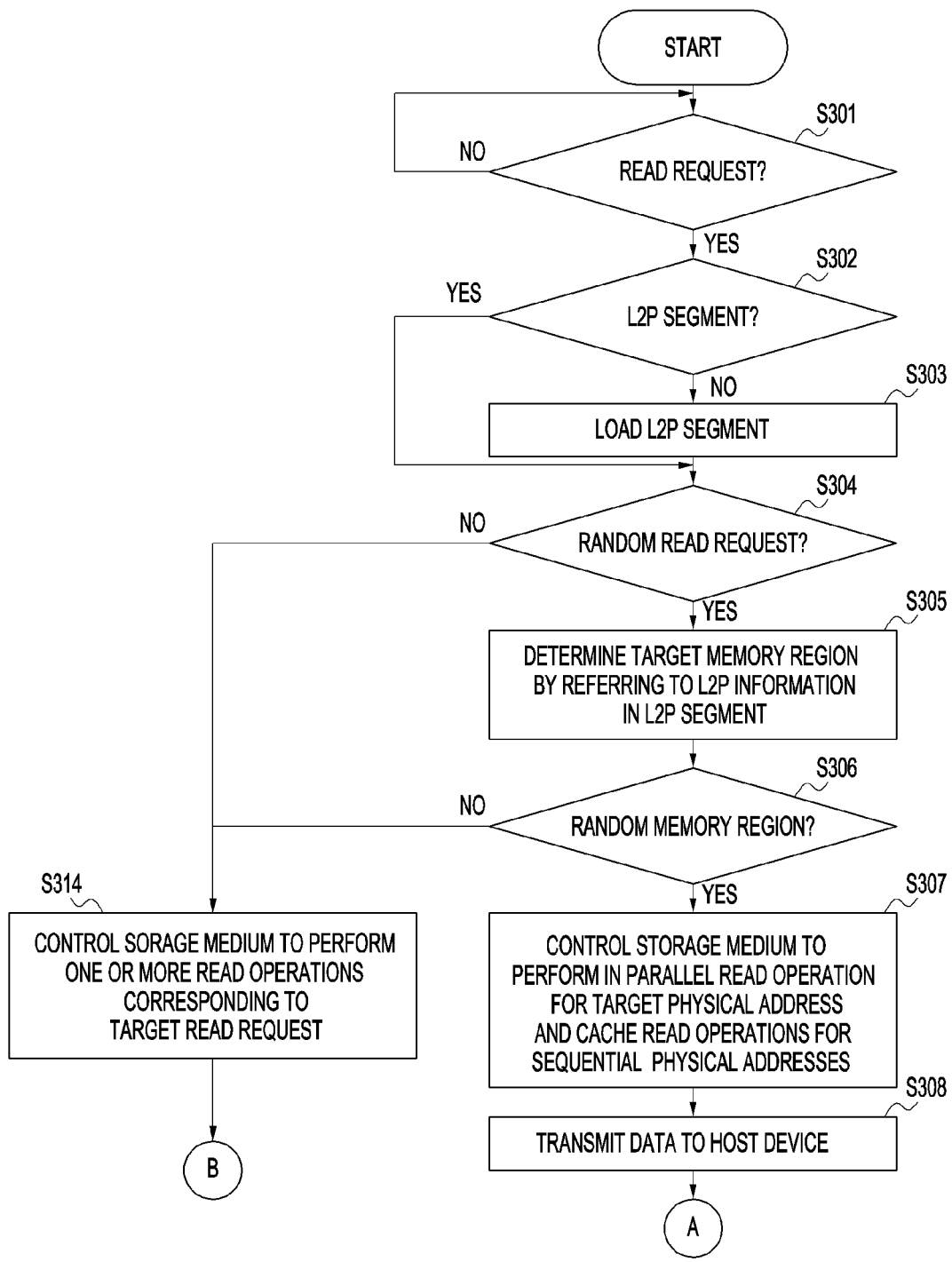
FIGS. 14A and 14B are a flowchart illustrating an operating method of a read unit of FIG. 1 according to an embodiment of the present disclosure.
Figure 14B:
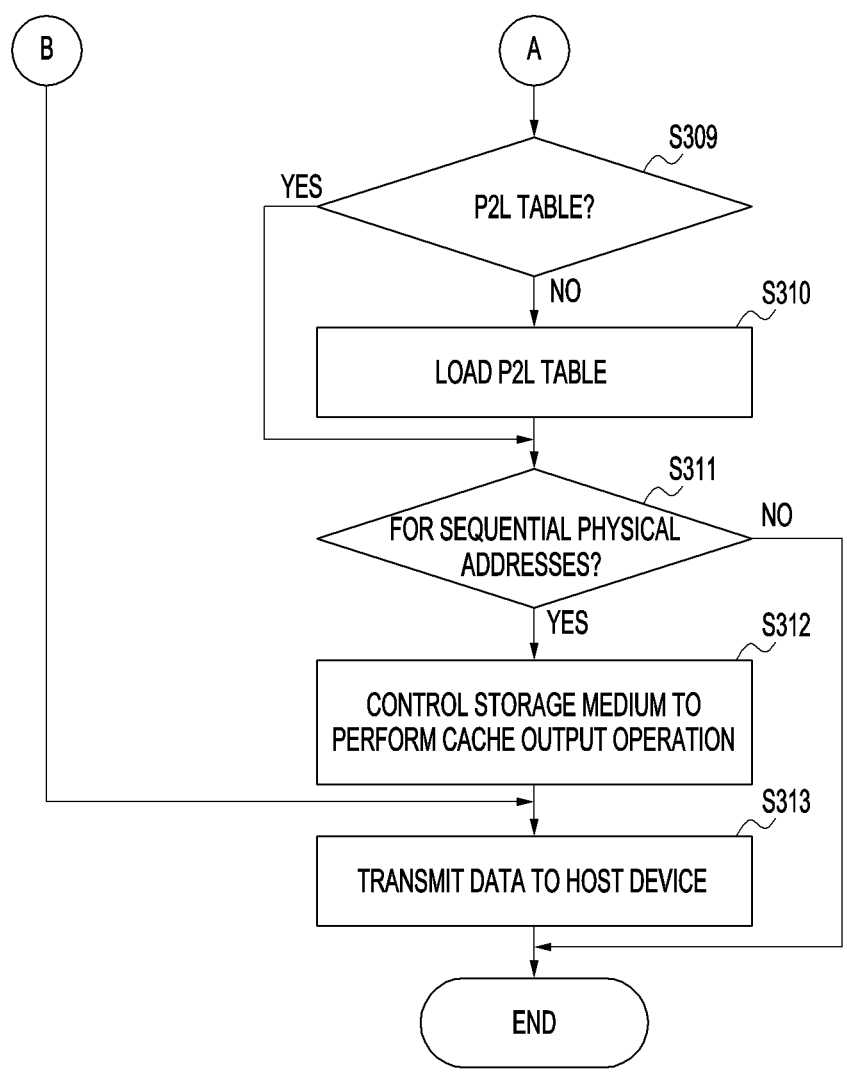

FIGS. 14A and 14B are a flowchart illustrating an operating method of the read unit 120 of FIG. 1 according to an embodiment of the present invention.

Referring to FIG. 14A, operations S301 to S306 and S314 may be the same as operations S201 to S206 and S211 of FIG. 12 and therefore the detailed description thereon will be omitted.

In operation S307, the read unit 120 may control the storage medium 200 to perform, in parallel, a read operation for the target physical address and cache read operations for physical addresses, which are sequential together with the target physical address.

In operation S308, the read unit 120 may provide a host device with data read from the storage medium 200.

Referring to FIG. 14B, operations S309 and S310 may be the same as operations S207 and S208 of FIG. 12 and therefore the detailed description thereon will be omitted.

In operation S311, the read unit 120 may determine the target read request and one or more other random read requests queued in the read request queue RRQ as corresponding to sequential physical addresses of the target memory region (that is, cache hit for the one or more other random read requests) by referring to the P2L table P2LTB of the target memory region. The read unit 120 may determine whether the sequential physical addresses of the target memory region i.e., the one or more physical addresses, which are sequential together with the target physical address within the P2L table P2LTB of the target memory region, are respectively mapped to the logical addresses corresponding to the one or more other random read requests. When the target read request and the one or more other random read requests are determined as corresponding to sequential physical addresses of the target memory region, the process may proceed to operation S312.

On the other hand, when there is not any random read request other than the target read request in the read request queue RRQ or when the target read request and the one or more other random read requests are determined as not corresponding to sequential physical addresses of the target memory region, the process may end. According to an embodiment, when there is not any random request other than the target read request in the read request queue RRQ or when the target read request and the one or more other random read requests are determined as not corresponding to sequential physical addresses of the target memory region, the read unit 120 may stand-by for a predetermined amount of time until another random read request is received from a host device.

In operation S312, the read unit 120 may control the storage medium 200 to perform the cache output operations on data corresponding to the one or more other random read requests among data cached in the internal buffers. The read unit 120 may control the storage medium 200 to perform the cache output operations for the one or more physical addresses, which are sequential together with the target physical address and determined through the P2L table P2LTB of the target memory region in operation S311.

In operation S313, the read unit 120 may provide a host device with data read from the storage medium 200.

According to an embodiment, operations S308 and S309 may be performed sequentially or in parallel.

Figure 15A:
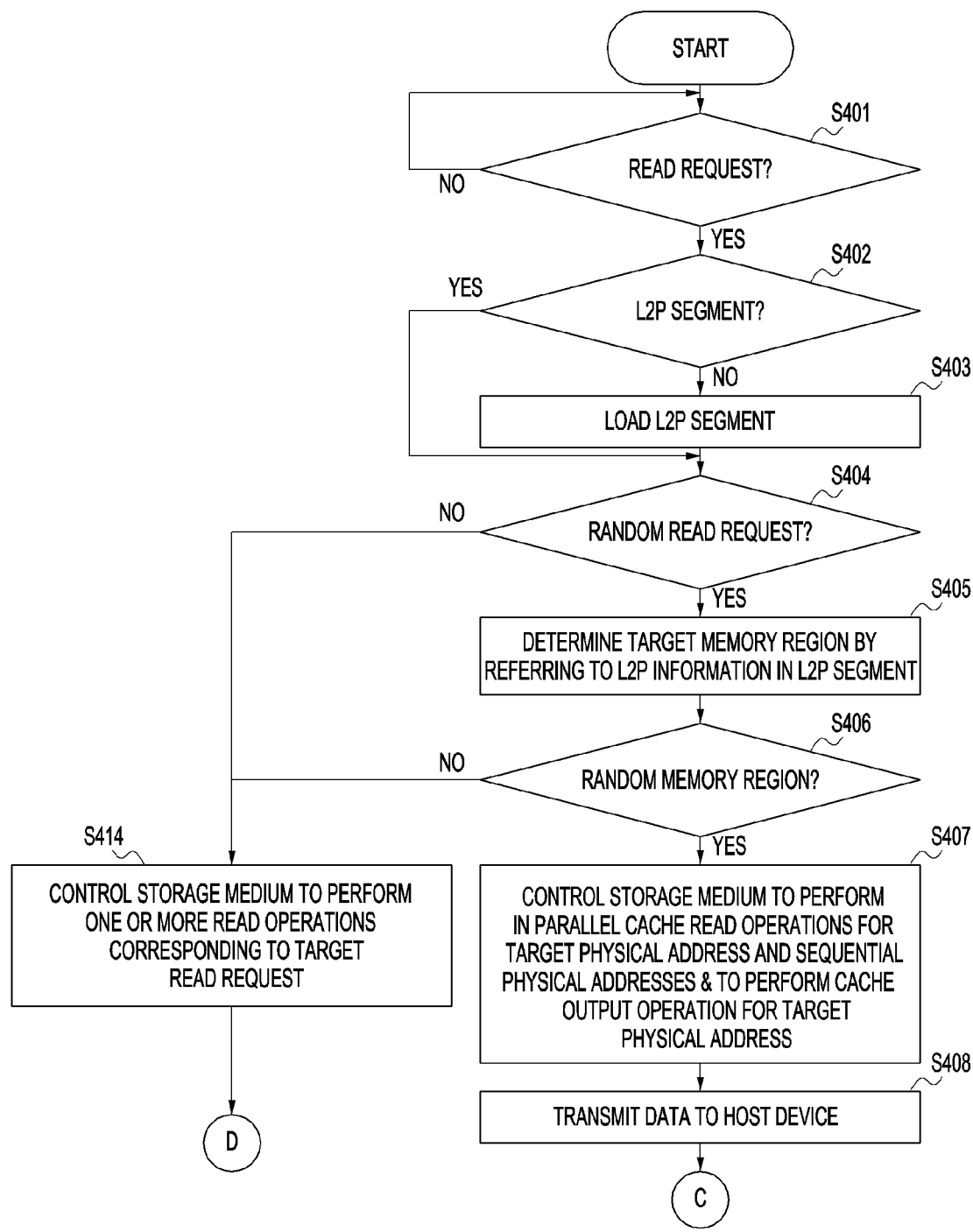
FIGS. 15A and 15B are a flowchart illustrating an operating method of a read unit of FIG. 1 according to an embodiment of the present disclosure.
Figure 15B:
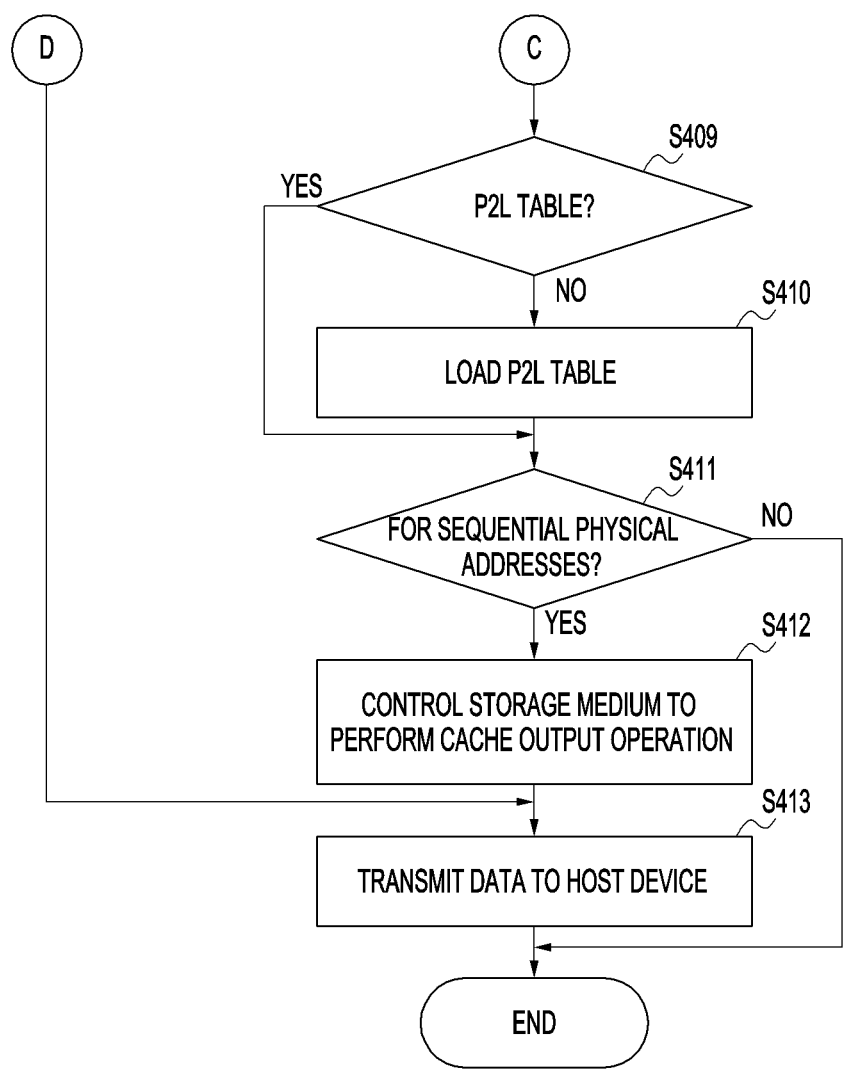

FIGS. 15A and 15B are a flowchart illustrating an operating method of the read unit 120 of FIG. 1 according to an embodiment of the present invention.

Referring to FIGS. 15A and 15B, operations S401 to S406 and S408 to S414 may be the same as operations S301 to S306 and S308 to S314 of FIGS. 14A and 14B and therefore the detailed description thereon will be omitted.

In operation S407, the read unit 120 may control the storage medium 200 to perform, in parallel, the cache read operations for the target physical address and the physical addresses, which are sequential together with the target physical address and may control the storage medium 200 to perform the cache output operation for the target physical address.

Figure 16:
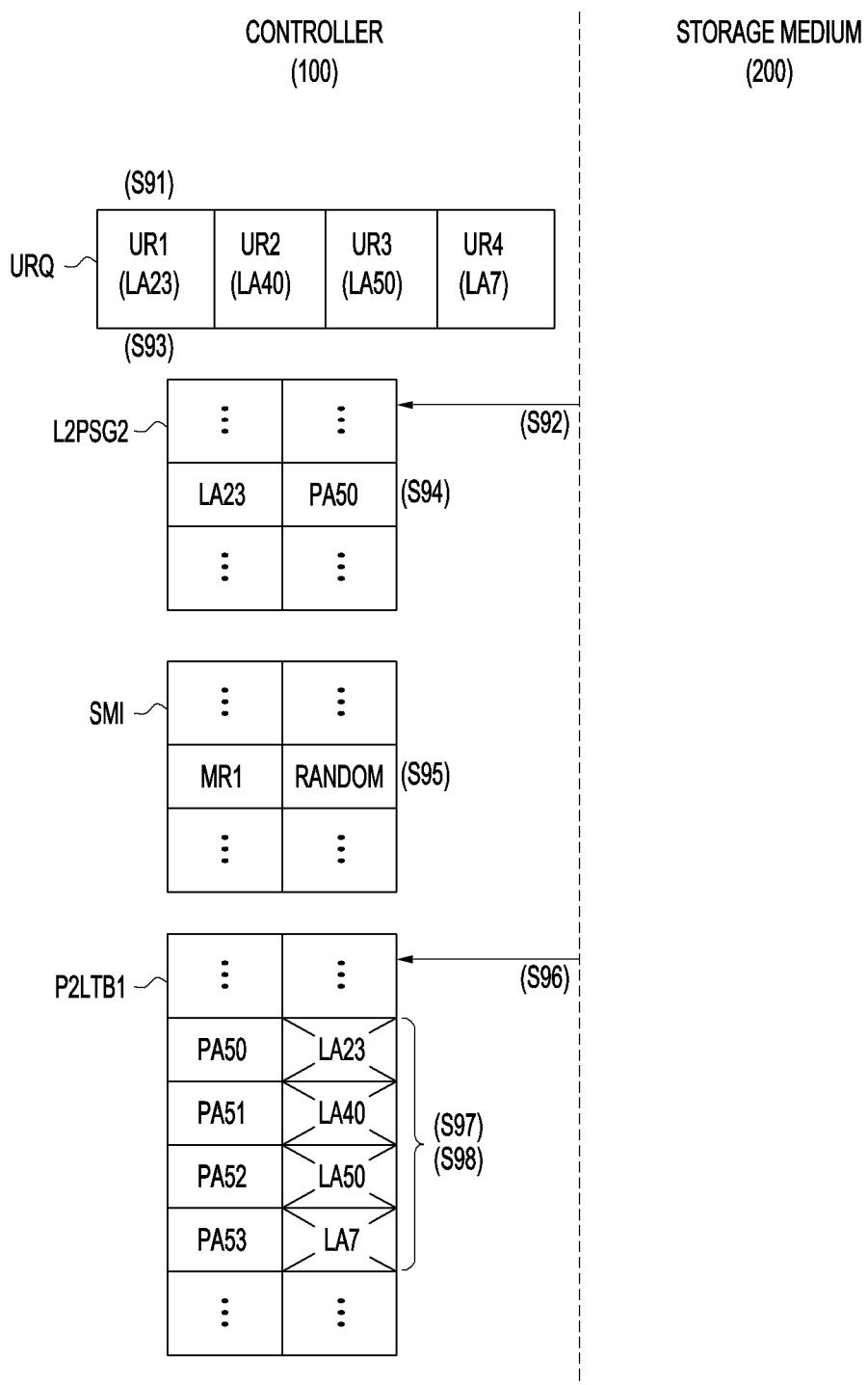
FIG. 16 is a diagram illustrating an operation that a controller of FIG. 1 processes a random unmap request according to an embodiment of the present disclosure.

FIG. 16 is a diagram illustrating an operation that the controller 100 of FIG. 1 processes a random unmap request according to an embodiment of the present invention.

When removing data stored in the memory system 10, a host device may provide the controller 100 with an unmap request for a logical address of the data. In response to the unmap request, the controller 100 may invalidate mapping information for the logical address. Later, the controller 100 may completely remove the data corresponding to the invalidated mapping information from the storage medium 200 through, for example, a garbage collection operation.

A host device may remove, at a time, pseudo-random data from the memory system 10 in units of files. Like read requests for fragmented pseudo-random data, unmap requests for the fragmented pseudo-random data may be sequentially provided according to an order that the fragmented pseudo-random data are stored in the storage medium 200. According to an embodiment, the controller 100 may process unmap requests in a similar way to processing read requests as described above and therefore the controller 100 may promptly and effectively process the unmap request for pseudo-random data, which improves operation performance of the memory system 10.

Referring to FIG. 16, the controller 100 may further include a separate request queue URQ. The request queue URQ may be configured to store unmap requests. The operation illustrated in FIG. 16 may be generally similar to the operation illustrated in FIG. 6.

In operation S91, the controller 100 may check whether there is an unmap request in the request queue URQ and may identify a target logical address LA23 corresponding to a target unmap request UR1 that is enqueued at a head of the request queue URQ among unmap requests in the request queue URQ.

In operation S92, the controller 100 may load, from the storage medium 200 to the memory 130, the L2P segment L2PSG2 including the L2P information of the target logical address LA23. Operation S92 may be omitted when there is the L2P segment L2PSG2 already in the memory 130.

In operation S93, the controller 100 may determine the target unmap request UR1 as a random unmap request based on the target logical address LA23. Criteria for determining a target unmap request as a random unmap request or a sequential unmap request may be similar to the criteria for determining a write request as a random write request or a sequential write request.

In operation S94, the controller 100 may determine a target memory region MR1 by referring to the L2P information of the target logical address LA23 within the L2P segment L2PSG2. Specifically, the controller 100 may identify a target physical address PA50 mapped to the target logical address LA23 by referring to the L2P information of the target logical address LA23 within the L2P segment L2PSG2 and may determine, as the target memory region MR1, a memory region including a memory unit of the target physical address PA50.

In operation S95, the controller 100 may determine the target memory region MR1 as a random memory region by referring to the storage medium management information SMI.

In operation S96, the controller 100 may load the P2L table P2LTB1 of the target memory region MR1 from the storage medium 200 to the memory 130. Operation S96 may be omitted when there is the P2L table P2LTB1 already in the memory 130.

In operation S97, the controller 100 may determine whether the target unmap request UR1 and one or more other random unmap requests UR2 to UR4 queued in the request queue URQ correspond to sequential physical addresses PA50 to PA53 of the target memory region MR1 by referring to the P2L table P2LTB1 of the target memory region MR1. The process of the determination of the target unmap request UR1 and the one or more other random unmap requests UR2 to UR4 queued in the request queue URQ as corresponding to sequential physical addresses PA50 to PA53 of the target memory region MR1 may be similar to operation S37 of FIG. 6.

In operation S98, the controller 100 may invalidate the P2L information corresponding to the target unmap request UR1 and the one or more other random unmap requests UR2 to UR4 within the P2L table P2LTB1. That is, the controller 100 may invalidate the P2L information corresponding to the sequential physical addresses PA50 to PA53 of the target memory region MR1. For example, the controller 100 may invalidate the P2L information by overwriting dummy values as the P2L information or adding a separate unmap mark to the P2L information. In the following figures, invalidated mapping information will be indicated with a mark "X".

Therefore, as to the controller 100 according to an embodiment, there is no need to load all the L2P segments L2PSG2, L2PSG5, L2PSG6 and L2PSG0 (see FIG. 10A) from the storage medium 200 and to invalidate the L2P information of the logical addresses LA23, LA40, LA50 and LA7 within the respective L2P segments L2PSG2, L2PSG5, L2PSG6 and L2PSG0 in order to process the unmap requests UR1 to UR4. The controller 100 according to an embodiment may promptly process the unmap requests UR1 to UR4 through the P2L table P2LTB1, which improves the operational performance of the memory system 10.

Figure 17:
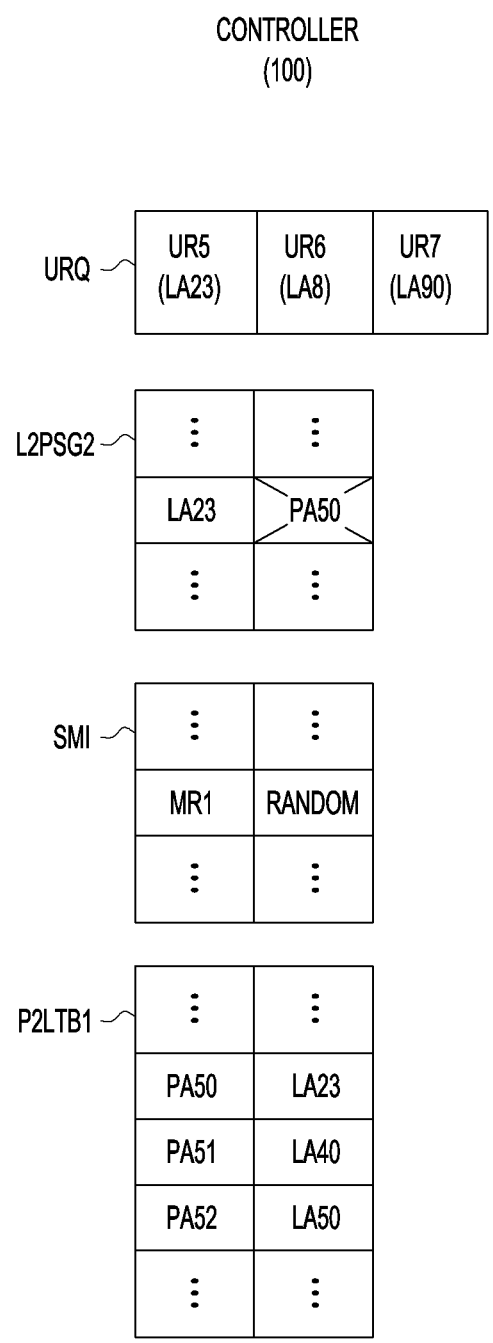
FIG. 17 is a diagram illustrating an operation that a controller of FIG. 1 processes a random unmap request according to an embodiment of the present disclosure.

FIG. 17 is a diagram illustrating an operation that the controller 100 of FIG. 1 processes a random unmap request according to an embodiment of the present invention. The operation illustrated in FIG. 17 may be generally similar to the operation illustrated in FIG. 7.

Referring to FIG. 17, the controller 100 may determine the target unmap request UR5 and one or more other random unmap requests UR6 and UR7 queued in the request queue URQ as not corresponding to sequential physical addresses of the target memory region MR1 by referring to the P2L table P2LTB1 of the target memory region MR1.

Therefore, the controller 100 may invalidate the L2P information of the target logical address LA23 of the target unmap request UR5 within the L2P segment L2PSG2. For example, the controller 100 may invalidate the L2P information by overwriting dummy values as the L2P information or adding a separate unmap mark to the L2P information.

According to an embodiment, the controller 100 may invalidate the P2L information corresponding to the target physical address PA50 within the P2L table P2LTB1. That is, when the P2L table P2LTB1 is already loaded to the memory 130, the controller 100 may process the target unmap request UR5 through the loaded P2L table P2LTB1.

Figure 18:
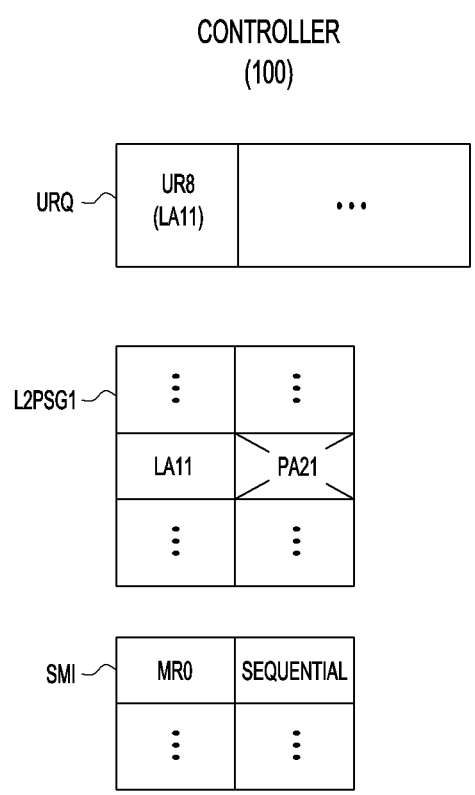
FIG. 18 is a diagram illustrating an operation that a controller of FIG. 1 processes a random unmap request according to an embodiment of the present disclosure.

FIG. 18 is a diagram illustrating an operation that the controller 100 of FIG. 1 processes a random unmap request according to an embodiment of the present invention. FIG. 18 illustrates a case that the controller 100 receives a random unmap request UR8 for data stored in a sequential memory region MR0. The operation illustrated in FIG. 18 may be generally similar to the operation illustrated in FIG. 8.

Referring to FIG. 18, when the target memory region MR0 is determined as a sequential memory region, the controller 100 may invalidate the L2P information of the target logical address LA11 of the target unmap request UR8 within the L2P segment L2PSG1.

Figure 19:
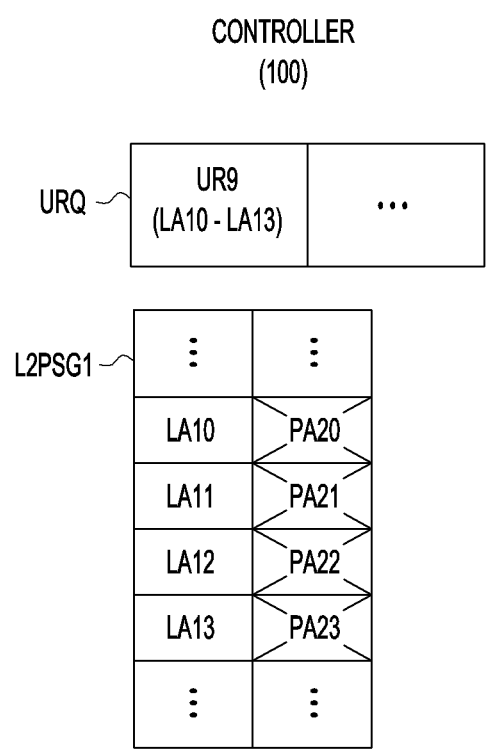
FIG. 19 is a diagram illustrating an operation that a controller of FIG. 1 processes a sequential unmap request according to an embodiment of the present disclosure.

FIG. 19 is a diagram illustrating an operation that the controller 100 of FIG. 1 processes a sequential unmap request according to an embodiment of the present invention.

Referring to FIG. 19, when the target unmap request UR9 is determined as a sequential unmap request, the controller 100 may invalidate the L2P information of the target logical addresses LA10 to LA13 of the target unmap request UR9 within the L2P segment L2PSG1.

Figure 20:
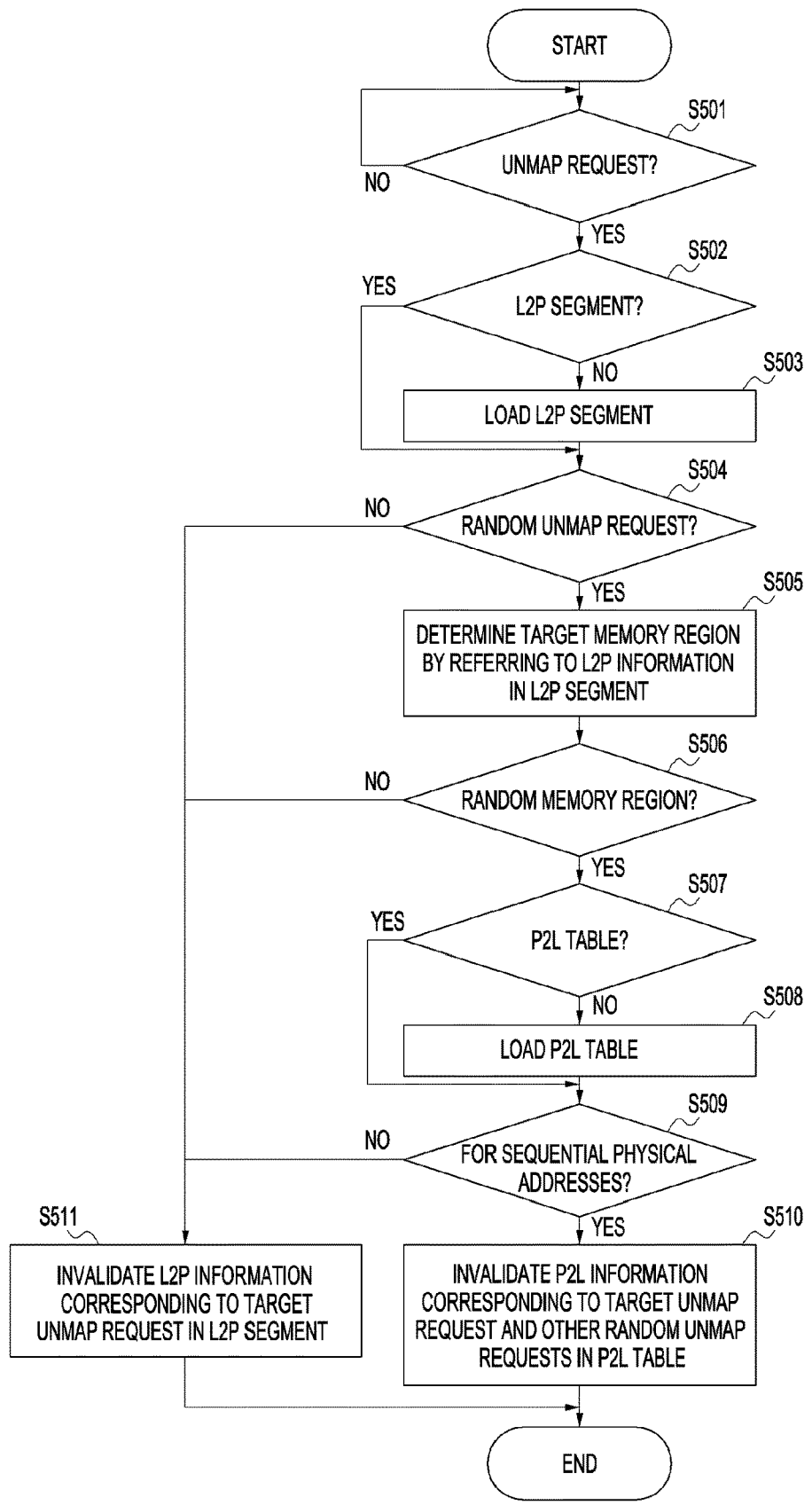
FIG. 20 is a flowchart illustrating an operating method of a controller of FIG. 1 according to an embodiment of the present disclosure.

FIG. 20 is a flowchart illustrating an operating method of the controller 100 of FIG. 1 according to an embodiment of the present invention.

Referring to FIG. 20, operations S501 to S509 may be the same as operations S201 to S209 of FIG. 12, except that what is processed is not a read request but an unmap request, therefore the detailed description thereon will be omitted.

In operation S510, the controller 100 may invalidate, within the P2L table P2LTB of the target memory region, the P2L information corresponding to the target unmap request and the one or more other random unmap requests queued in the request queue URQ. That is, when the target unmap request and the one or more other random unmap requests are determined as corresponding to sequential physical addresses of the target memory region in operation S509, the controller 100 may invalidate the P2L information corresponding to the sequential physical addresses within the P2L table P2LTB of the target memory region.

In operation S511, the controller 100 may invalidate the L2P information corresponding to the target unmap request within the L2P segment L2PSG. That is, the controller 100 may invalidate the L2P information of the target logical address within the L2P segment L2PSG.

The unmap requests that are not processed together with the target unmap request due to operation S511 and therefore remain in the request queue URQ may be processed as another target unmap requests according to the above described process of FIG. 20.

Figure 21:
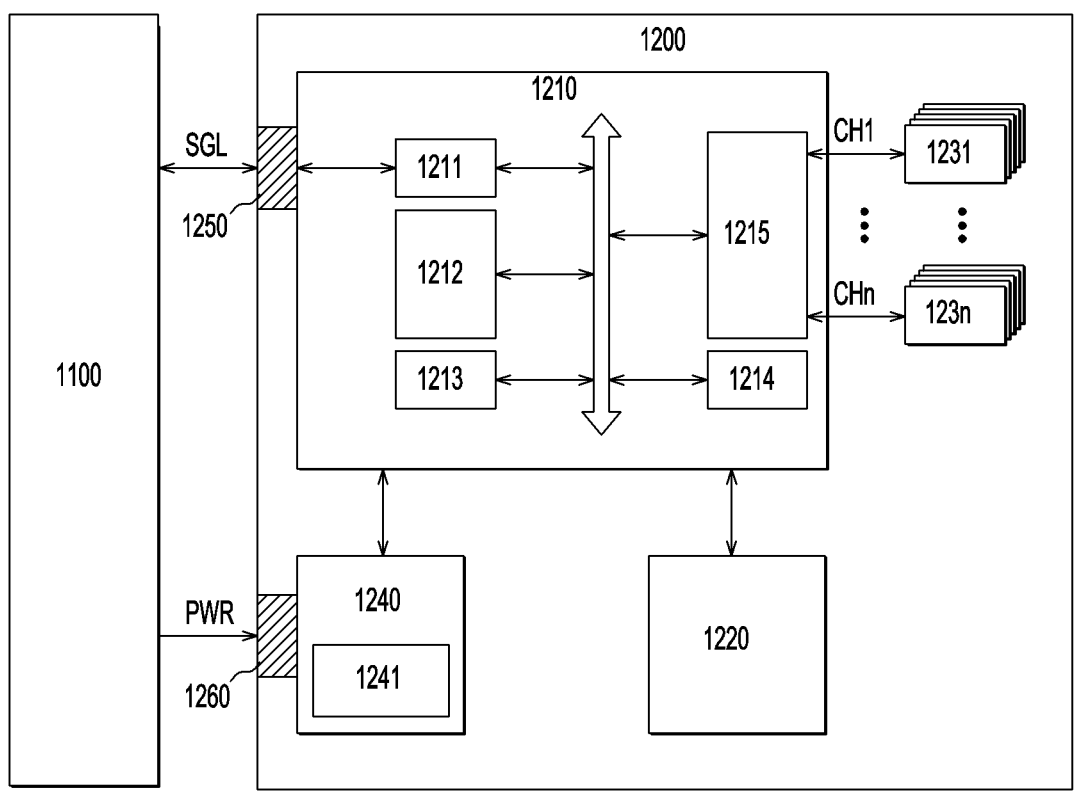
FIG. 21 is a diagram illustrating a data processing system including a solid state drive (SSD) in accordance with an embodiment of the present disclosure.

FIG. 21 is a diagram illustrating a data processing system 1000 including a solid state drive (SSD) 1200 in accordance with an embodiment of the present invention. Referring to FIG. 21, the data processing system 1000 may include a host device 1100 and the SSD 1200. The SSD 1200 may be an embodiment of the memory system shown in FIG. 1.

The SSD 1200 may include a controller 1210, a buffer memory device 1220, a plurality of nonvolatile memory devices 1231 to 123n, a power supply 1240, a signal connector 1250, and a power connector 1260.

The controller 1210 may control general operations of the SSD 1200. The controller 1210 may include a host interface unit 1211, a control unit 1212, a random access memory 1213, an error correction code (ECC) unit 1214, and a memory interface unit 1215.

The host interface unit 1211 may exchange a signal SGL with the host device 1100 through the signal connector 1250. The signal SGL may include a command, an address, data, and so forth. The host interface unit 1211 may interface the host device 1100 and the SSD 1200 according to the protocol of the host device 1100. For example, the host interface unit 1211 may communicate with the host device 1100 through any of standard interface protocols such as secure digital, universal serial bus (USB), multimedia card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnect (PCI), PCI express (PCI-E) and universal flash storage (UFS).

The control unit 1212 may analyze and process the signal SGL received from the host device 1100. The control unit 1212 may control operations of internal function blocks according to a firmware or a software for driving the SSD 1200. The random access memory 1213 may be used as a working memory for driving such a firmware or software.

The control unit 1212 may include the write unit 110 and read unit 120 shown in FIG. 1. The random access memory 1213 may be embodied as the memory 130 shown in FIG. 1.

The ECC unit 1214 may generate the parity data for data to be transmitted to at least one of the nonvolatile memory devices 1231 to 123n. The generated parity data may be stored together with the data in the nonvolatile memory devices 1231 to 123n. The ECC unit 1214 may detect an error of the data read from at least one of the nonvolatile memory devices 1231 to 123n, based on the parity data. If a detected error is within a correctable range, the ECC unit 1214 may correct the detected error.

The memory interface unit 1215 may provide control signals such as commands and addresses to at least one of the nonvolatile memory devices 1231 to 123n, according to control of the control unit 1212. Moreover, the memory interface unit 1215 may exchange data with at least one of the nonvolatile memory devices 1231 to 123n, according to control of the control unit 1212. For example, the memory interface unit 1215 may provide the data stored in the buffer memory device 1220, to at least one of the nonvolatile memory devices 1231 to 123n, or provide the data read from at least one of the nonvolatile memory devices 1231 to 123n, to the buffer memory device 1220.

The buffer memory device 1220 may temporarily store data to be stored in at least one of the nonvolatile memory devices 1231 to 123n. Further, the buffer memory device 1220 may temporarily store the data read from at least one of the nonvolatile memory devices 1231 to 123n. The data temporarily stored in the buffer memory device 1220 may be transmitted to the host device 1100 or at least one of the nonvolatile memory devices 1231 to 123n according to control of the controller 1210. The buffer memory device 1220 may be embodied as the memory 130 shown in FIG. 1.

The nonvolatile memory devices 1231 to 123n may be used as storage media of the SSD 1200. The nonvolatile memory devices 1231 to 123n may be coupled with the controller 1210 through a plurality of channels CH1 to CHn, respectively. One or more nonvolatile memory devices may be coupled to one channel. The nonvolatile memory devices coupled to each channel may be coupled to the same signal bus and data bus.

The power supply 1240 may provide power PWR inputted through the power connector 1260, to the inside of the SSD 1200. The power supply 1240 may include an auxiliary power supply 1241. The auxiliary power supply 1241 may supply power to allow the SSD 1200 to be normally terminated when a sudden power-off occurs. The auxiliary power supply 1241 may include large capacity capacitors.

The signal connector 1250 may be configured by various types of connectors depending on an interface scheme between the host device 1100 and the SSD 1200.

The power connector 1260 may be configured by various types of connectors depending on a power supply scheme of the host device 1100.

Figure 22:
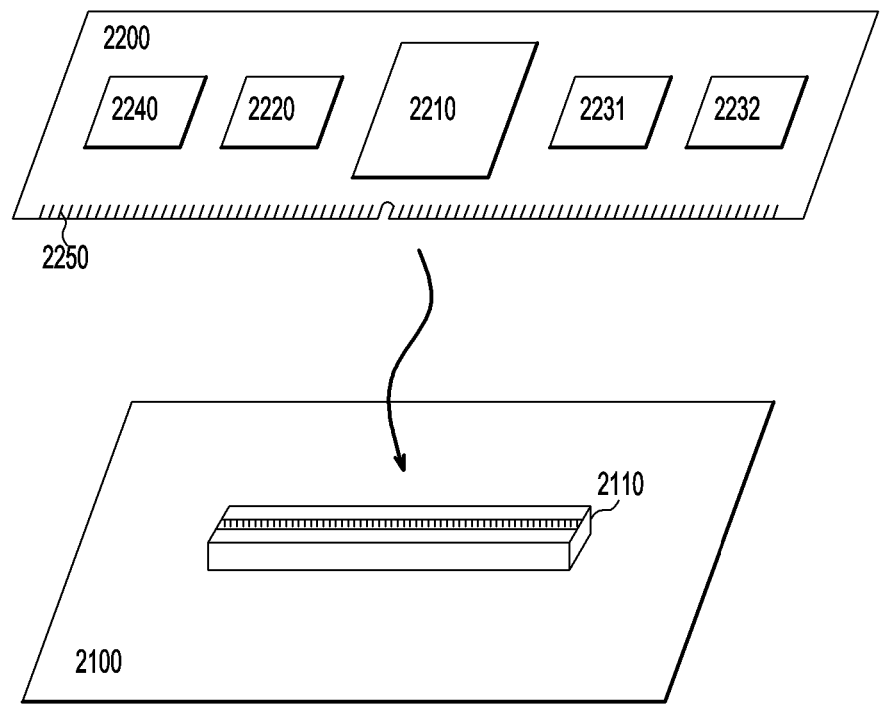
FIG. 22 is a diagram illustrating a data processing system including a memory system in accordance with an embodiment of the present disclosure.

FIG. 22 is a diagram illustrating a data processing system 2000 including a memory system 2200 in accordance with an embodiment of the present invention. Referring to FIG. 22, the data processing system 2000 may include a host device 2100 and the memory system 2200.

The host device 2100 may be configured in the form of a board such as a printed circuit board. Although not shown, the host device 2100 may include internal function blocks for performing the function of a host device.

The host device 2100 may include a connection terminal 2110 such as a socket, a slot or a connector. The memory system 2200 may be mounted to the connection terminal 2110.

The memory system 2200 may be configured in the form of a board such as a printed circuit board. The memory system 2200 may be referred to as a memory module or a memory card. The memory system 2200 may include a controller 2210, a buffer memory device 2220, nonvolatile memory devices 2231 and 2232, a power management integrated circuit (PMIC) 2240, and a connection terminal 2250.

The controller 2210 may control general operations of the memory system 2200. The controller 2210 may be configured in the same manner as the controller 1210 shown in FIG. 21.

The buffer memory device 2220 may temporarily store data to be stored in the nonvolatile memory devices 2231 and 2232. Further, the buffer memory device 2220 may temporarily store the data read from the nonvolatile memory devices 2231 and 2232. The data temporarily stored in the buffer memory device 2220 may be transmitted to the host device 2100 or the nonvolatile memory devices 2231 and 2232 according to control of the controller 2210.

The nonvolatile memory devices 2231 and 2232 may be used as storage media of the memory system 2200.

The PMIC 2240 may provide the power inputted through the connection terminal 2250, to the inside of the memory system 2200. The PMIC 2240 may manage the power of the memory system 2200 according to control of the controller 2210.

The connection terminal 2250 may be coupled to the connection terminal 2110 of the host device 2100. Through the connection terminal 2250, signals such as commands, addresses, data and so forth, and power may be transferred between the host device 2100 and the memory system 2200. The connection terminal 2250 may be configured into various types depending on an interface scheme between the host device 2100 and the memory system 2200. The connection terminal 2250 may be disposed on any side of the memory system 2200.

Figure 23:
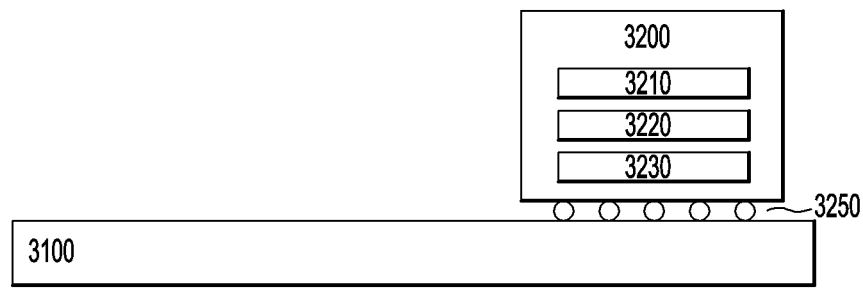
FIG. 23 is a diagram illustrating a data processing system including a memory system in accordance with an embodiment of the present disclosure.

FIG. 23 is a diagram illustrating a data processing system 3000 including a memory system 3200 in accordance with an embodiment of the present invention. Referring to FIG. 23, the data processing system 3000 may include a host device 3100 and the memory system 3200.

The host device 3100 may be configured in the form of a board such as a printed circuit board. Although not shown, the host device 3100 may include internal function blocks for performing the function of a host device.

The memory system 3200 may be configured in the form of a surface-mounting type package. The memory system 3200 may be mounted to the host device 3100 through solder balls 3250. The memory system 3200 may include a controller 3210, a buffer memory device 3220, and a nonvolatile memory device 3230.

The controller 3210 may control general operations of the memory system 3200. The controller 3210 may be configured in the same manner as the controller 1210 shown in FIG. 21.

The buffer memory device 3220 may temporarily store data to be stored in the nonvolatile memory device 3230. Further, the buffer memory device 3220 may temporarily store the data read from the nonvolatile memory device 3230. The data temporarily stored in the buffer memory device 3220 may be transmitted to the host device 3100 or the nonvolatile memory device 3230 according to control of the controller 3210.

The nonvolatile memory device 3230 may be used as the storage medium of the memory system 3200.

Figure 24:
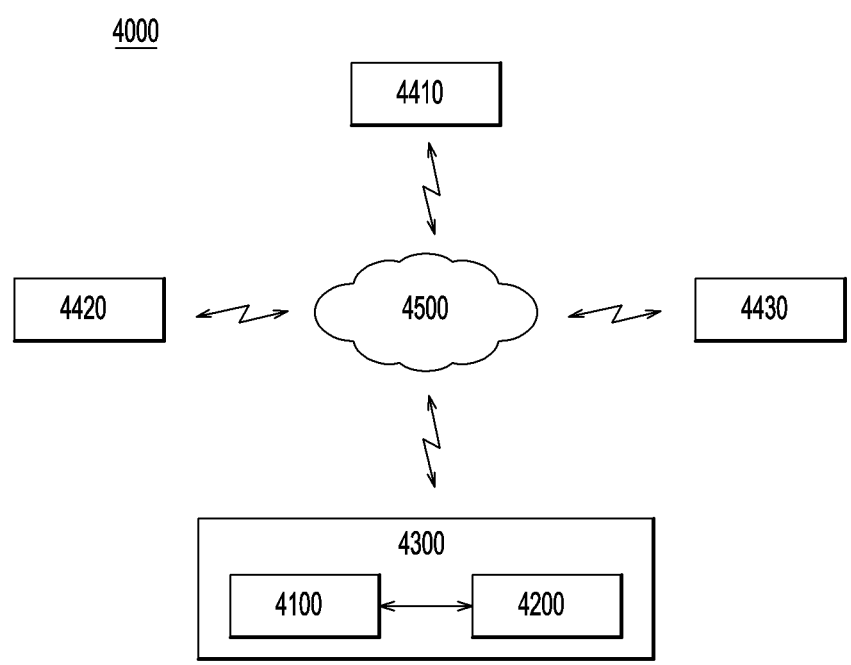
FIG. 24 is a diagram illustrating a network system including a memory system in accordance with an embodiment of the present disclosure.

FIG. 24 is a diagram illustrating a network system 4000 including a memory system 4200 in accordance with an embodiment of the present invention. Referring to FIG. 24, the network system 4000 may include a server system 4300 and a plurality of client systems 4410 to 4430 which are coupled through a network 4500.

The server system 4300 may service data in response to requests from the plurality of client systems 4410 to 4430. For example, the server system 4300 may store the data provided from the plurality of client systems 4410 to 4430. For another example, the server system 4300 may provide data to the plurality of client systems 4410 to 4430.

The server system 4300 may include a host device 4100 and the memory system 4200. The memory system 4200 may be configured by the memory system 10 shown in FIG. 1, the SSD 1200 shown in FIG. 21, the memory system 2200 shown in FIG. 22 or the memory system 3200 shown in FIG. 23.

Figure 25:
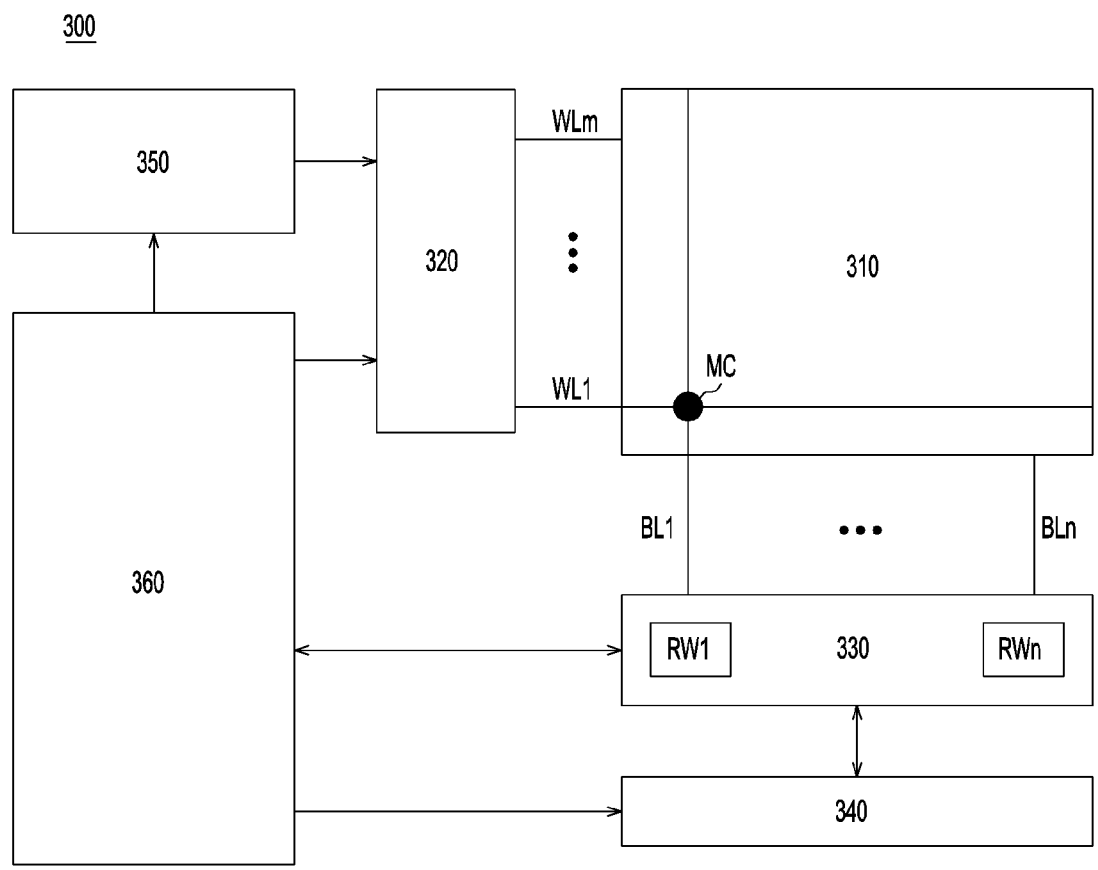
FIG. 25 is a block diagram illustrating a nonvolatile memory device included in a memory system in accordance with an embodiment of the present disclosure.

FIG. 25 is a block diagram illustrating a nonvolatile memory device 300 included in a memory system in accordance with an embodiment of the present invention. Referring to FIG. 25, the nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines BL1 to BLn intersect with each other.

The row decoder 320 may be coupled with the memory cell array 310 through the word lines WL1 to WLm. The row decoder 320 may operate according to control of the control logic 360. The row decoder 320 may decode an address provided from an external device (not shown). The row decoder 320 may select and drive the word lines WL1 to WLm, based on a decoding result. For instance, the row decoder 320 may provide a word line voltage provided from the voltage generator 350, to the word lines WL1 to WLm.

The data read/write block 330 may be coupled with the memory cell array 310 through the bit lines BL1 to BLn. The data read/write block 330 may include read/write circuits RW1 to RWn respectively corresponding to the bit lines BL1 to BLn. The data read/write block 330 may operate according to control of the control logic 360. The data read/write block 330 may operate as a write driver or a sense amplifier according to an operation mode. For example, the data read/write block 330 may operate as a write driver which stores data provided from the external device, in the memory cell array 310 in a write operation. For another example, the data read/write block 330 may operate as a sense amplifier which reads out data from the memory cell array 310 in a read operation.

The column decoder 340 may operate according to control of the control logic 360. The column decoder 340 may decode an address provided from the external device. The column decoder 340 may couple the read/write circuits RW1 to RWn of the data read/write block 330 respectively corresponding to the bit lines BL1 to BLn with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided from the external device. For example, the control logic 360 may control operations of the nonvolatile memory device 300 such as read, write and erase operations of the nonvolatile memory device 300.

While certain embodiments have been described above, it will be understood to those skilled in the art that the embodiments described are by way of example only. Accordingly, the memory system should not be limited based on the described embodiments. Rather, the memory system described herein should only be limited in light of the claims that follow when taken in conjunction with the above description and accompanying drawings.

What is claimed is:

1. A memory system comprising:
a storage medium including a plurality of memory regions; and
a controller configured to:
store data corresponding to a write request into a memory region of a random attribute or a memory region of a sequential attribute among the memory regions and to update logical-to-physical (L2P) information corresponding to the stored data, and
update, when storing the data into the memory region of the random attribute, physical-to-logical (P2L) information corresponding to the stored data within a P2L table of the memory region of the random attribute, the P2L table including sequential physical addresses of the memory region of the random attribute as indexes.

2. The memory system of claim 1, wherein the controller is further configured to:
refer to a P2L table of a target memory region of a target random read request when the target memory region is determined to have the random attribute, and control, according to a result of the referring to the P2L table of the target memory region, the storage medium to perform, in parallel, read operations on the target memory region in response to the target random read request and one or more other random read requests.

3. The memory system of claim 2, wherein the controller controls the storage medium to perform the read operations in parallel when the target random read request and the one or more other random read requests are determined as corresponding to sequential physical addresses of the target memory region with reference to the P2L table of the target memory region.

4. The memory system of claim 2,
wherein the controller is further configured to manage storage medium management information indicating whether each of the plurality of memory regions has the random attribute or the sequential attribute, and
wherein, before the referring to the P2L table, the controller is further configured to refer to L2P information of a target logical address corresponding to the target random read request to determine the target memory region and configured to refer to the storage medium management information to determine whether the target memory region has the random attribute or the sequential attribute.

5. The memory system of claim 1, wherein, when a target memory region of a target random read request is determined to have the sequential attribute, the controller is further configured to control the storage medium to perform only a read operation corresponding to the target random read request.

6. The memory system of claim 1, wherein the controller stores the data into the memory region of the random attribute when the write request is determined as a random write request and stores the data into the memory region of the sequential attribute when the write request is determined as a sequential write request.

7. The memory system of claim 1, wherein, when a target memory region of a target random read request is determined to have the random attribute, the controller is further configured to control the storage medium to perform, in parallel, a read operation for a target physical address corresponding to the target random read request and cache read operations for one or more physical addresses, which are sequential together with the target physical address within the target memory region.

8. The memory system of claim 7, wherein, after the controlling of the cache read operations, the controller is further configured to control the storage medium to perform cache output operations for the one or more physical addresses when one or more logical addresses corresponding to one or more other random requests are determined as mapped respectively to the one or more physical addresses with reference to a P2L table of the target memory region.

9. The memory system of claim 1, wherein when a target memory region of a target random read request is determined to have the random attribute, the controller is further configured to control the storage medium to:
perform, in parallel, cache read operations for a target physical address corresponding to the target random read request and one or more physical addresses, which are sequential together with the target physical address within the target memory region, and
perform a cache output operation for the target physical address.

10. The memory system of claim 9, wherein, after the controlling of the cache read operations, the controller is further configured to control the storage medium to perform cache output operations for the one or more physical addresses when one or more logical addresses corresponding to one or more other random requests are determined as mapped respectively to the one or more physical addresses with reference to a P2L table of the target memory region.

11. The memory system of claim 1, wherein the controller is further configured to:
refer to a P2L table of a target memory region of a target random unmap request when the target memory region is determined to have the random attribute, and
invalidate, according to a result of the referring to the P2L table of the target memory region, P2L information corresponding to the target random unmap request and one or more other random unmap requests within the P2L table of the target memory region in response to the target unmap read request and the one or more other random unmap requests.

12. The memory system of claim 11, wherein the controller invalidates the P2L information when the target random unmap request and the one or more other random unmap requests are determined as corresponding to sequential physical addresses of the target memory region with reference to the P2L table of the target memory region.

13. The memory system of claim 11, wherein, when the target memory region is determined to have the sequential attribute, the controller is further configured to invalidate L2P information of a target logical address corresponding to the target random unmap request.

14. A memory system comprising:
a storage medium including a plurality of memory regions; and
a controller configured to refer to a physical-to-logical (P2L) table of a target memory region of a random attribute to determine whether a target read request and one or more other random read requests correspond to sequential physical addresses of the target memory region and configured to control, according to a result of the determination, the storage medium to perform, in parallel, read operations on the target memory region in response to the target read request and the one or more other random read requests.

15. The memory system of claim 14,
wherein the controller is further configured to:
determine, as the sequential physical addresses, a target physical address corresponding to the target read request and one or more physical addresses sequential together with the target physical address within the P2L table, and
identify one or more logical addresses mapped to the sequential physical addresses during the determination of whether the target read request and the one or more other random read requests correspond to the sequential physical addresses, and wherein the controller controls the storage medium to perform the read operations in parallel when the identified one or more logical addresses are determined as identical to logical addresses of the one or more other random read requests.

16. The memory system of claim 14,
wherein the controller is further configured to manage storage medium management information indicating whether each of the plurality of memory regions has the random attribute or a sequential attribute, and
wherein, before the referring to the P2L table, the controller is further configured to refer to logical-to-physical (L2P) information of a target logical address corresponding to the target read request to determine the target memory region and configured to refer to the storage medium management information to determine whether the target memory region has the random attribute or the sequential attribute.

17. The memory system of claim 16, wherein, when the target memory region is determined to have the sequential attribute, the controller is further configured to control the storage medium to perform only a read operation corresponding to the target read request without the referring to the P2L table.

18. The memory system of claim 14, wherein the controller is further configured to store data corresponding to a write request into a memory region of the random attribute when the write request is determined as a random write request and configured to store the data into a memory region of a sequential attribute when the write request is determined as a sequential write request.

19. An operating method of a controller, the operating method comprising:
determining sequential physical addresses corresponding to data pieces stored in a superblock as respectively mapped to logical addresses corresponding to queued random read requests for the data pieces by referring to physical-to-logical (P2L) information of the superblock; and
controlling, in response to the random read requests, a memory device to perform an operation of reading each of the data pieces in a parallel manner.

20. The operating method of claim 19,
wherein the determining of the sequential physical addresses includes identifying, as the sequential physical addresses, one or more physical addresses sequential together with a target physical address within the P2L information, and
wherein the identifying of the physical addresses includes identifying the target physical address by referring to logical-to-physical (L2P) information of a target logical address corresponding to a target random read request among the random read requests.

* * * * *